US012761933B2

(12) United States Patent
Dua et al.

(10) Patent No.: US 12,761,933 B2
(45) **Date of Patent: *Oct. 13, 2026**

(54) FACILITATING USER DEVICE AND/OR AGENT DEVICE ACTIONS DURING A COMMUNICATION SESSION

(71) Applicant: GOOGLE LLC, Mountain View, CA (US)

(72) Inventors: Robin Dua, San Francisco, CA (US); Andrew Tomkins, Menlo Park, CA (US); Sujith Ravi, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/615,767

(22) Filed: Mar. 25, 2024

(65) Prior Publication Data

US 2024/0231862 A1 Jul. 11, 2024

Related U.S. Application Data

(63) Continuation of application No. 17/687,316, filed on Mar. 4, 2022, now Pat. No. 11,941,420, which is a (Continued)

(51) Int. Cl.

*G06F 40/30* (2020.01)
*G06F 3/0481* (2022.01)

(Continued)

(52) U.S. Cl.

CPC ............ *G06F 9/453* (2018.02); *G06F 3/0481* (2013.01); *G06F 40/20* (2020.01); *G06F 40/30* (2020.01);

(Continued)

(58) Field of Classification Search

CPC ........................................................ G10L 15/22

See application file for complete search history.

(56) References Cited

U.S. PATENT DOCUMENTS

| | | | | |
|---|---|---|---|---|
| 9,699,128 | B1 | 7/2017 | Zhang | |
| 10,977,563 | B2 * | 4/2021 | Ajmera | G06Q 30/0202 |

(Continued)

FOREIGN PATENT DOCUMENTS

| | | |
|---|---|---|
| CN | 102422268 | 4/2012 |
| CN | 103916709 | 7/2014 |

(Continued)

OTHER PUBLICATIONS

European Patent Office; Summons issued in Application No. 18765262.3; 8 pages; dated Apr. 18, 2024.

(Continued)

*Primary Examiner* — Douglas Godbold
(74) *Attorney, Agent, or Firm* — Gray Ice Higdon

(57) ABSTRACT

Facilitating user device and/or agent device actions during a communication session. An interactive communications system provides outputs that are tailored to enhance the functionality of the communication session, reduce the number of dialog "turns" of the communications session and/or the number of user inputs to devices involved in the session, and/or otherwise mitigate consumption of resources during the communication session. In various implementations, the communication session involves user device(s) of a user, agent device(s) of an agent, and the interactive system. The interactive communications system can analyze various communications from the user device(s) and/or agent device(s) during a communication session in which the user directs various communications to the agent, and in which the agent optionally directs various communications to the user. The interactive communications system provides action performance element(s) and/or other output(s) that (Continued)

are each specific to a corresponding current intent and corresponding current action of the communication session.

16 Claims, 12 Drawing Sheets

Related U.S. Application Data continuation of application No. 16/621,769, filed as application No. PCT/US2018/047474 on Aug. 22, 2018, now Pat. No. 11,269,666.

(60) Provisional application No. 62/548,928, filed on Aug. 22, 2017.

(51) Int. Cl.

| | |
|---|---|
| ***G06F 9/451*** | (2018.01) |
| ***G06F 40/20*** | (2020.01) |
| ***G06N 20/00*** | (2019.01) |
| ***G10L 15/22*** | (2006.01) |
| ***H04L 67/60*** | (2022.01) |

(52) U.S. Cl.

CPC .............. *G06N 20/00* (2019.01); *G10L 15/22* (2013.01); *H04L 67/60* (2022.05)

(56) References Cited

U.S. PATENT DOCUMENTS

| | | | | |
|---|---|---|---|---|
| 11,269,666 | B2 * | 3/2022 | Dua | G06F 40/20 |
| 11,941,420 | B2 * | 3/2024 | Dua | G06F 9/453 |
| 2009/0228264 | A1 * | 9/2009 | Williams | H04M 3/493 704/9 |
| 2010/0124325 | A1 * | 5/2010 | Weng | G10L 15/22 704/251 |
| 2014/0164509 | A1 | 6/2014 | Lynch et al. | |
| 2014/0288932 | A1 * | 9/2014 | Yeracaris | G10L 17/10 704/249 |
| 2014/0297268 | A1 * | 10/2014 | Govrin | G06N 5/02 704/9 |
| 2014/0337266 | A1 | 11/2014 | Kalns et al. | |
| 2015/0169285 | A1 | 6/2015 | Reyes et al. | |
| 2016/0163311 | A1 | 6/2016 | Crook et al. | |
| 2016/0225370 | A1 | 8/2016 | Kannan et al. | |
| 2016/0342955 | A1 | 11/2016 | Brock | |
| 2017/0301348 | A1 * | 10/2017 | Chen | G10L 25/51 |
| 2019/0040591 | A1 | 2/2019 | Dua et al. | |
| 2020/0143114 | A1 * | 5/2020 | Dua | G06F 9/453 |
| 2022/0188133 | A1 | 6/2022 | Dua et al. | |

FOREIGN PATENT DOCUMENTS

| | | |
|---|---|---|
| CN | 103927229 | 7/2014 |
| CN | 107077464 | 8/2017 |
| EP | 3122001 | 1/2017 |
| WO | 2016060480 | 4/2016 |

OTHER PUBLICATIONS

European Patent Office; Result of Consultation issued in Application No. 18765262.3; 3 pages; dated Nov. 18, 2024.
European Patent Office, Intention to Grant issued in Application No. 18765262.3; 64 pages; dated Dec. 23, 2024.
Intellectual Property India; Hearing Notice issued in Application No. 201927050797; 7 pages; dated Aug. 16, 2023.
China National Intellectual Property Administration; Grant Noticed issued in Application No. 201880039265.9; 2 pages; dated Aug. 10, 2023.
China National Intellectual Property Administration; First Office Action issued in Application No. 201880039265.9; 19 pages; dated Mar. 10, 2023.
European Patent Office; Communication pursuant to Article 94(3) issued in Application No. 18765262.3, 6 pages, dated Aug. 1, 2022.
European Patent Office; Communication pursuant to Article 94(3) EPC issued in Application No. 18765262.3; 7 pages; dated Jul. 16, 2021.
Intellectual Property India; Examination Report issued in Application No. 201927050797; 7 pages; dated Mar. 22, 2021.
European Patent Office; International Search Report and Written Opinion of Ser. No. PCT/US2018/047474; 6 pages; dated Nov. 27, 2018.

* cited by examiner

FACILITATING USER DEVICE AND/OR AGENT DEVICE ACTIONS DURING A COMMUNICATION SESSION

BACKGROUND

The usage of various digital communication modalities has increased with the proliferation of smart phones, tablet computers, wearable devices, and other user devices. As a result, direct person-to-person voice calls are being supplanted by alternative communication modalities such as rich communication services (RCS) messages, short message service (SMS) messages, multimedia messaging service (MMS) messages, over-the-top (OTT) chat messages, etc.

SUMMARY

This specification is directed generally to various systems, apparatus, and computer-readable media for facilitating user device and/or agent device actions during a communication session. In various implementations, the communication session involves user device(s) of a user, agent device(s) of an agent, and an interactive communications system. As described herein, the interactive communications system can analyze various communications from the user device(s) and/or agent device(s) during a communication session in which the user (via the user device(s)) directs various communications to the agent, and in which the agent (via the agent device(s)) optionally directs various communications to the user.

The interactive communications system provides, to the user device(s) and/or to the agent device(s), action performance element(s) and/or other output(s) that are each specific to a corresponding current intent and corresponding current action of the communication session. Such outputs are tailored to enhance the functionality of the communication session, reduce the number of dialog "turns" of the communications session, and/or otherwise mitigate consumption of network and/or hardware resources during the communication session. For example, reducing the number of dialog "turns" may reduce the total number of user inputs received by the devices during the communication session and, thereby, reduce the number of times that the devices must detect and process such inputs during the session. This can have a positive effect on the battery life of such devices. The reduction in dialog "turns" may additionally reduce display-on time and/or usage of other output components such as speakers at the devices by reducing the overall length of the communication session. This can further positively affect the battery life of the devices.

Further, various outputs can be selectively provided by the interactive communications system automatically in certain situations. Such an output can be provided on behalf of a user associated with the user device (e.g., the system can cause an output to be rendered at an agent device, where the output is on behalf of the user), or on behalf of an agent associated with the agent device (e.g., the system can cause an output to be rendered at a user device, where the output is on behalf of the agent), and in some situations can be provided automatically without first prompting any device associated with an entity on whose behalf it is provided. This can also mitigate usage of various computational resources.

In some implementations, the interactive communications system is implemented at least in part in "the cloud" (e.g., via a remote cluster of high performance computing devices) and communicates with the user device(s) and/or agent device(s) via one or more networks. In some implementations, the interactive communications system is additionally or alternatively implemented at least in part by user device(s) and/or agent device(s). For example, a user device and an agent device can each implement an instance of the system, and the instances can interact with one another via one or more networks. Also, for example, a user device and an agent device can each implement a corresponding client application that performs some functionality of the system, and that interfaces with a cloud-based system that performs other functionality of the system. For instance, the client applications can interface with the cloud-based system over one or more networks and via one or more application programming interfaces (APIs).

As one example, the interactive communications system can receive natural language input(s) and/or other input(s) transmitted from a user device and/or an agent device during a communication session. Based on analysis of such inputs, the interactive communications system can determine a current intent of the communication session, and an action for the determined current intent. For example, the system can process the inputs and/or annotations of such inputs over one or more machine learning models (e.g., a deep neural network model trained based on training data specific to a domain of the agent) to determine the current intent, and can utilize a mapping of intents to actions to determine an action for the current intent. Further, the system can generate an action performance element that is specific to the action, and that is optionally tailored to parameters for the agent (and/or a domain for the agent) and/or to parameters for a user of the user device. The action performance element can be caused to be rendered (e.g., graphically and/or audibly) at one or more of the user device(s) and/or at one or more of the agent device(s). The action performance element can be configured so that, in response to a user interface selection (e.g., a "click", "tap", or "verbal" selection) of the action performance element, the corresponding device initiates performance of the action with the tailored parameters. For example, the corresponding device can itself perform the entirety of the action with the tailored parameters, or the corresponding device can transmit a communication to a remote interactive communications system and/or other component(s) to cause such component(s) to perform the action with the tailored parameters.

In some implementations and/or situations, a generated action performance element can be provided during the communication session and/or within an application and/or interface utilized for the communication session. For example, a generated action performance element can be provided during the communication session as soon as it is generated, and/or can be provided along with an ongoing transcript of the communication session. In other implementations and/or situations, a generated action performance element can be provided after the communication session has ended and/or within an application and/or interface that is separate from that utilized in the communication session. For example, a generated action performance element can be "queued" for subsequently providing to the user following the communication session. For instance, the generated action performance element can be in particular an application element that is associated with a given application that is separate from that utilized in the communication session, and can be provided through an interface of the given application when the given application is subsequently executed and/or surfaced. Also, for instance, the generated action performance element can be provided as a system "notification card" or through a similar interface that is separate from the interface utilized for the communication session. Such a notification card could be provided during, or after, the communication session.

Some non-limiting examples of action performance elements described herein include: reply content suggestion elements (textual reply suggestion elements, graphical reply suggestion elements, etc.), scheduling elements, reminder elements, payment elements, arrival notification elements, camera elements, application elements, and/or dialog routing elements.

Reply content suggestion elements each indicate content that is contextually relevant to the communication session and that, when selected, cause a reply communication that includes the content to be automatically generated and/or automatically sent to one or more other devices in the communication session. The content suggestion elements can include contextually relevant text and/or visual elements (e.g., emojis, GIFs, video, etc.). The content suggestion elements can additionally or alternatively include contextually relevant documents or other information items, such as a picture, audio, a contact, a Portable Document File (PDF) format document, etc. Such information items can be personal to a corresponding agent and/or user, and may optionally be stored locally on a corresponding device that renders the content suggestion element. In some implementations, when a reply content suggestion element is selected at a device, the device generates a corresponding reply communication and transmits the reply communication to another device in the communication session, or transmits the reply communication to the interactive communication system, which then routes the reply communication to the other device. In some other implementations, when a reply content suggestion element is selected at a device, an indication of the selection is transmitted to the interactive communications system, and the interactive communications system generates a corresponding reply communication and transmits the reply communication to another device in the communication session. The reply communication can be initiated, based on the determined current intent and corresponding action in the mapping referred to above, with very few user inputs to the devices involved in the communication session.

Scheduling elements can, when selected, automatically schedule (or reschedule) at least one meeting or can initiate an interactive exchange for scheduling (or rescheduling) at least one meeting. In some implementations, a scheduling element can indicate a date and/or time window that is selected based on agent and/or user parameters, such as electronic calendar data of a user and/or of an agent (e.g., when are the user and/or the agent "available"), stored preferences of the user and/or the agent (e.g., date(s) and/or time(s) preferred by the user and/or the agent), etc. In response to selection of such a scheduling element at a device, a corresponding electronic appointment entry that is personal to the user can be created and/or a corresponding electronic appointment entry that is personal to the agent can be created—optionally following confirmatory input in response to one or more prompts. For example, a user can select such a scheduling element at the user device and a corresponding electronic appointment entry for the user automatically created in response to the selection (e.g., through interaction with an API of a local or web-based calendar application). Further, in response to the selection, a corresponding electronic appointment entry for the agent can be automatically created—or a corresponding prompt first transmitted to an agent device of the agent, and the electronic appointment entry for the agent created in response to affirmative input from the agent device in response to the prompt. As mentioned above, some scheduling elements initiate an interactive exchange for scheduling. For example, in response to selection of such an element at a device, an interactive calendar and/or other interactive user interface can be presented and interacted with via the device to enable selection of an appointment. Such interactive exchange can be driven by the interactive communications system a local app, and/or a remote action agent. As with the reply communication discussed above, this process can occur with very few user inputs to the devices involved in the communication session.

Reminder elements can, when selected, automatically set a reminder or initiate an interactive exchange for scheduling a reminder, such as a time-based reminder, proximity-based reminder, and/or other context-based reminder. Payment elements can, when selected, automatically initiate transfer of monetary funds, or an interactive exchange for the transfer of monetary funds. Arrival notification elements can, when selected at a given device, cause an estimated time of arrival, a live location map, and/or other indication of an individual's progress toward a location to be rendered at another device. Camera elements can, when selected, cause a camera interface and/or application to be initiated that enables an image (or video) to be captured via a camera of a corresponding device. The captured image (or video) can be automatically transmitted to another device and/or transmitted after further confirmation.

In some implementations, an application element can, when selected, cause a corresponding local or web-based application to be executed and/or surfaced at a corresponding device—optionally in a state, and/or with populated content, that is contextually relevant to the communication session. In some implementations, an application element can, when selected at a device, cause a local or web-based application to take one or more corresponding actions, without necessarily surfacing the application or content from the application at the device. This may facilitate a more efficient use of the display and/or other output elements of the device, as in at least this example the display and/or the other output elements are not required to surface the application or content from the application at the device. For example, an application element, when selected, can cause an action to be performed by an application through interfacing with an API of the application, but without causing the application to be surfaced at the client device and/or without causing content from the application to be presented at the client device.

In some implementations, an application element can, when selected by a user, cause an application, when subsequently explicitly activated by the user, to be activated in a state and/or with populated content that is contextually relevant to the communication session. For example, for a "schedule appointment" action, an application element can be provided that, when selected, does not automatically schedule the appointment via a corresponding application (e.g., a calendar application). Rather, selection can instead cause the corresponding application, when it is subsequently activated by the user, to be opened in a state and/or with content that is based on the communication session and that enables the user to interact with the corresponding application to schedule the appointment. In this manner, the user need not immediately divert his/her attention from the communication session to schedule the appointment. Rather, the next time the user activates the corresponding application, the user can be reminded of the need to schedule the appointment, and appointment time(s), appointment date(s), and/or appointment title(s) suggested via the corresponding application can be based on the communication session. The interactive communications system can interface with an API of the corresponding application, and/or otherwise transmit contextually relevant data to the corresponding application, to cause it to be opened in such a state.

A dialog routing element can present a contextually relevant recommendation for routing all or aspects of communications(s) of a communication session to a particular agent device and, when selected, causes such aspect(s) to be routed to the particular agent device.

As described herein, in various implementations an action performance element for a communication session can be generated based on an action that is mapped to a current intent of the communication session. Further, the action performance element can optionally be tailored to parameters for the agent and/or a domain for the agent of the communication session. In some of those implementations, the action performance element can be tailored to agent specific parameters that are defined for the agent and for the action, unless it is determined that agent specific parameters are not defined (e.g., in any database utilized by the system) for the action. If it is determined that the agent specific parameters are not defined, the action performance element can optionally be generated based on stored parameters for a domain of the agent, where the domain encompasses that agent and a plurality of additional agents.

As one example, assume the agent is an automotive repair business, the intent is a "schedule oil change appointment" intent and the action is an "oil change scheduling" action. Further assume that, for the agent, there is no defined agent specific parameter for "length of appointment" for an "oil change scheduling" action. In such an example, a stored parameter for "length of appointment" for the "oil change scheduling" action for a domain of the agent can be determined and instead utilized in generating an action performance element. For example, the stored parameter for the domain can be a mean or median "length of appointment" that is defined for agents of the domain—and an action performance element generated that, when selected, initiates the scheduling of an appointment that is of a duration defined by the mean or median "length of appointment". Such domain parameters can vary from domain to domain, and from action to action. For example, a "length of appointment" parameter for a general "scheduling" action can vary greatly between a "photography" domain and a "pest control" domain. Also, for example, a "length of appointment" parameter for an "oil change scheduling" action of an "automotive repair" domain can vary greatly from a "length of appointment" parameter for an "engine repair scheduling" action of the "automotive repair" domain.

In some implementations, a parameter for a domain of an agent can be generated, and/or selected for use in a given communication session, based on one or more contextual or inferred signals, such as signals related to the given communication session. For example, multiple domain parameters can be stored for a given action and given domain, and each of the domain parameters associated with one or more dates and/or times. One of the multiple domain parameters can be selected for use in a given communication session based on a date and/or time of the given communication session corresponding to the date(s) and/or time(s) associated with the selected domain parameter. For instance, for a "yard service" domain and a "schedule yard cleanup" action, a "length of appointment" parameter for the fall season may be stored and may vary from a stored "length of appointment" parameter for the spring season.

As also described herein, in various implementations, in response to determining that agent specific parameter(s) are not available for an action (e.g., not defined in any database utilized by the system), a prompt can be generated that solicits parameters for the action. Further, the prompt can be transmitted to an agent device of the corresponding agent, and responsive content utilized to resolve the agent specific parameters. Thereafter, the agent specific parameters can be utilized for the agent for the action, e.g. in lieu of the domain parameters. In some of those implementations, the prompt can be transmitted in response to determining that the action has been invoked in association with the agent in at least a threshold quantity of communication sessions. In this manner, computational resources are not wasted on rare and/or erroneous actions for a given agent. Rather, generation and/or transmission of a prompt can be contingent on the action being invoked with at least a threshold degree in association with the agent—thereby indicating the action is relevant to the agent.

As mentioned above, in various implementations an action performance element is provided for presentation on behalf of an entity. For example, an action performance element can be transmitted to a user device on behalf of an agent. In some of those various implementations, a prompt can selectively be presented to the entity (via a corresponding device) on whose behalf the action performance element is presented, prior to presenting the element on behalf of the entity. For example, the element may only be presented, at a user device on behalf of the entity, if affirmative input is received in response to presenting the prompt. In some of those implementations, various criteria can be utilized in determining whether to automatically provide the action performance element for presentation on behalf of an entity without first prompting the entity, or to instead first prompt the entity—and optionally require affirmative input in response to the prompt before providing the action performance element for presentation on behalf of the entity. For example, the various criteria can be based on a confidence score for a current intent (e.g., does the confidence score satisfy a threshold). For instance, the confidence score for the current intent can be generated based on processing natural language input and/or other content of a communication session over one or more trained machine learning models that are each trained to predict, for one or more intents, a confidence score (e.g., a probability) that the intent is the current intent of the communication session.

Some examples provided above describe providing an action performance element that, when selected, causes a corresponding action to be initiated. However, as described herein, in some implementations and situations some actions can be initiated automatically without providing an action performance element for the action and requiring selection of the action performance element for the action. As one example, all or aspects of a communications of a communication session can be automatically routed to a particular agent device based on a determined current intent. For example, the communications can be routed to the particular agent device that is stored in association with the determined current intent. Further, the communications can be routed without first presenting a contextually relevant routing element to another agent device that had been actively engaged in the communication session. As another example, contextually relevant reply content can be automatically sent on behalf of an agent, without first presenting a reply content suggestion element to an agent device of the agent. For instance, the reply content can be automatically sent if an agent device has previously authorized automatic sending of such reply content and/or has replied with such reply content with at least a threshold frequency.

Various implementations described herein enable a user to utilize a common communications interface (e.g., an audible/voice-based interface and/or graphical interface) to interact with any of a plurality of disparate agents across a plurality of disparate domains. For example, the common communications interface may be utilized to engage any one of a plurality of agents in a "flooring" domain, engage any one of a plurality of agents in a "patent legal services" domain, engage any one of a plurality of agents in a "plumbing" domain, etc. This may enable computational resource efficient interactions with various agents to occur, relative to interactions via separate interfaces and/or applications that are each tailored to a particular agent and/or a particular domain.

As used herein, an "agent" references a particularly identifiable entity, such as a merchant. For example, a first agent can be a first plumbing business, a second agent can be a second plumbing business, a third agent can be a first automotive repair shop, etc. As used herein, a "user" typically references an individual that is utilizing one or more corresponding user devices to interact with an agent (e.g., via an interactive communications system and/or agent device(s) of the agent). As used herein, an "agent user" references an individual that is associated with a corresponding agent (e.g., an employee of the agent), and that is utilizing one or more corresponding agent devices to interact with a user during a communication session. As used herein, an "entity" references one of an agent or a user of a corresponding communication session. As used herein, a "device" references a computing device, such as a smartphone, tablet computer, laptop computer, desktop computer, a wearable electronic device (e.g., smart watches, glasses), an automobile electronic device, etc.

Various types of input are described herein that may be provided via user interface input device(s) of corresponding device(s) in a communication session. In some instances, an input may be natural language input that is free-form, such as textual input that is based on user interface input generated via one or more user interface input devices (e.g., based on typed input provided via a physical or virtual keyboard or based on spoken input provided via a microphone). As used herein, free-form input is input that is user-formulated and that is not constrained to a group of options presented for selection by the user (e.g., not constrained to a group of options presented in a drop-down menu).

It is noted that various examples are presented in the summary to provide an overview of various implementations of methods, apparatus, and computer readable media described herein. However, additional and/or alternative implementations are described more fully in the detailed description presented below.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
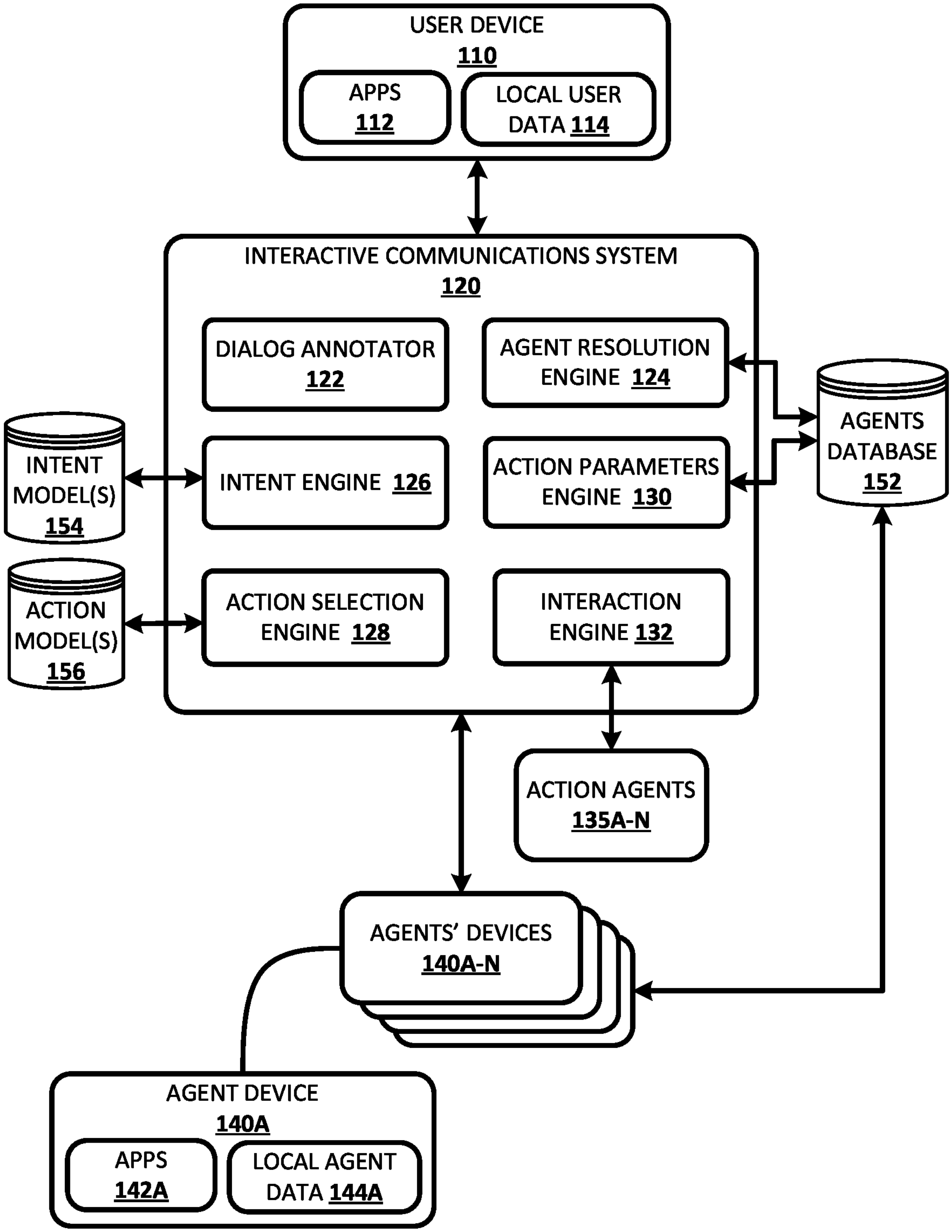
FIG. 1 is a block diagram of an example environment in which implementations disclosed herein may be implemented.

Now turning to FIG. 1, an example environment in which techniques disclosed herein may be implemented is illustrated. The example environment includes a user device 110, an interactive communications system 120, a plurality of agents' devices 140A-N, and a plurality of action agents 135A-N. The example environment further includes an agents database 152, one or more intent models 154, and one or more action models 156, that can be utilized by the interactive communications system 120.

The user device 110 is a computing device of a user that interacts with the interactive communications system 120 in engaging any one of a plurality of agents. Each of the agents' devices 140A-N is a corresponding computing device that is associated with a corresponding agent that can be interacted with via the interactive communications system 120. For example, agent device 140A can be a computing device of a first agent and can be operated by one or more employees of the first agent. Each agent can be associated with one or more of the agents' devices 140A-N. For example, a first agent can be associated with agent devices 140A and 140B, a second agent can be associated with only agent device 140C, etc. An association between a given agent and one of the agents' devices 140A-N can be established, for example, through login credentials for the given agent and/or other digital security measures to ensure a device is authorized by the given agent.

The user device 110 and the agents' devices 140A-N can each be a corresponding one of a variety of computing devices such as, for example, a standalone voice-activated speaker device, a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus (e.g., a smart watch) of the user that includes a computing device. Additional and/or alternative computing devices may be provided.

Although only one user device 110 is illustrated in FIG. 1, in many implementations all or aspects of the interactive communications system 120 may be remote and may interface with each of a plurality of user devices of multiple users. For example, the interactive communications system 120 may manage communications with each of the multiple devices via different sessions and may manage multiple sessions in parallel. For instance, the interactive communications system 120 in some implementations may be implemented as a cloud-based service employing a cloud infrastructure, e.g., using a server farm or cluster of high performance computers running software suitable for handling high volumes of requests from multiple users. Also, for example, the interactive communications system 120 may receive input from and/or provide output to multiple user devices of a single user. However, for the sake of simplicity, some examples herein are described with respect to a single user device 110.

Although interactive communications system 120 is illustrated in FIG. 1 as separate from the user device 110, and separate from the agents' devices 140A-N, in some implementations all or aspects of the interactive communications system 120 may be implemented by the user device 110 and/or by one or more of the agents' devices 140A-N. For example, the user device 110 and an agent device 140A can each implement an instance of the system, and the instances can interact with one another via one or more networks, such as a wide area network (WAN) (e.g., the Internet). Also, for example, the user device 110 and an agent device 140A device can each implement a corresponding client application that performs some functionality of the system, and that interfaces with a cloud-based system that performs other functionality of the system. For instance, the client applications can interface with the cloud-based system via one or more application programming interfaces (APIs).

The user device 110 executes one or more applications (apps) 112 that can be utilized in various techniques described herein. For example, one of the apps 112 can be an application that implements all or some of the functionality of the interactive communications system 120 and/or that provides a graphical interface for engaging in a communications session with an agent. Such an application can be separate from an operating system of the user device 110 (e.g., installed "on top" of the operating system)—or can be alternatively implemented directly by the operating system (e.g., considered an application of, but integral with, the operating system). Also, for example, one of the apps 112 can be an app that is utilized in performance of an action for a current intent of a communications session. For example, one of the apps 112 can be surfaced and/or executed in response to user selection of an action performance element generated according to techniques described herein. Also, for example, one of the apps 112 can be automatically (without requiring user selection of an action performance element) executed in the foreground/background based on a determined current intent. Action(s) performable by the automatically executed app, and that are mapped to the current intent, can then be triggered automatically (i.e., without requiring user confirmation), or can be suggested for triggering (i.e., suggested, then triggered only if affirmative user interface input is received in response to the suggestion).

The user device 110 may also optionally include local user data 114 on one or more computer readable media. The local user data 114 can include one or more parameters for a user of the user device 110, such as location(s) of the user (e.g., a residential address), a calendar of the user, etc. Parameters for the user may additionally or alternatively be stored remote from the user device 110. In some implementations, multiple types of user data are included in local user data 114 and/or in remote storage. For example, user data can include: user device data (e.g., a type of the user device, a current location of the user device); personal data (e.g., a work and/or home address of the user, a phone number of the user, an email address of the user, payment information of the user, calendar information of the user); and/or personal preferences (e.g., the user prefers appointments on Saturdays, the user prefers to receive calls at his/her mobile number).

One or more of the agents' devices 140A-N can also execute apps and/or can include local data for a corresponding agent. For example, agent device 140A is illustrated with apps 142A and local agent data 144A. The apps 142A can be utilized in various techniques described herein. For example, one of the apps 142A can be an application that implements all or some of the functionality of the interactive communications system 120 and/or that provides a graphical interface for engaging in a communications session with a user. As with the user device 110, such an app can be separate from an operating system of the agent device 140A, or can be implemented directly by the operating system. Also, for example, one of the apps 142A can be an app that is utilized in performance of an action for a current intent of a communications session. For example, one of the apps 142A can be surfaced and/or executed in response to user selection of an agent action performance element generated according to techniques described herein. The local agent data 144A can include one or more parameters for an agent associated with the agent device 140A, such as a calendar of the agent, agent specific parameters described herein, etc. Parameters for the agent may additionally or alternatively be stored remote from the agent device 140A (e.g., in agents database 152).

The interactive communications system 120 includes a dialog annotator 122, an agent resolution engine 124, an intent engine 126, an action selection engine 128, an action parameters engine 130, and an interaction engine 132. In some implementations, one or more of the engines of interactive communications system 120 may be omitted, combined, and/or implemented in a component that is separate from interactive communications system 120. Moreover, interactive communications system 120 may include additional engines not illustrated herein for the sake of simplicity.

The interactive communications system 120 receives instances of user input from the user device 110 during a communications session and/or receives instances of agent input from one or more of the agents' devices 140A-N of an agent during the communication session. For example, the interactive communications system 120 may receive free-form natural language voice input in the form of a streaming audio recording, and convert the voice input into text utilizing a voice-to-text module. The streaming audio recording may be generated by a device in response to signals received from a microphone of the device that captures spoken input of a user of the device. As another example, the interactive communications system 120 may receive free-form natural language typed input and/or even structured (non-free-form) input in some implementations.

In response to receiving an instance of input (from the user device 110 or one of the agents' devices 140A-N) during a communication session, the interactive communications system 120 selectively provides responsive output to the user device 110 and/or provides responsive output to one or more of the agents' devices 140A-N. When responsive output is provided to the user device 110 and to one or more of the agents' devices 140A-N, different responsive output can optionally be provided to each. Provided responsive output can include an action performance element and/or other output that is specific to a current intent and current action of the communication session. Further, provided responsive output can be in addition to content of the instance of input, although it may optionally be displayed or otherwise presented in combination with the content of the instance of input (e.g., provided responsive content may be provided as additional content presented along with a transcript of the communication session). The responsive output may be, for example, audio to be audibly presented by the device(s) (e.g., output via a speaker of the device), text, and/or graphical content to be graphically presented by the device(s) (e.g., rendered via a display of the device), etc.

The dialog annotator 122 of interactive communications system 120 processes natural language input and/or other input received via user device 110 and/or agents' devices 140A-N during a communication session, and generates annotated output for use by one or more other components of the interactive communications system 120. For example, the dialog annotator 122 may process natural language free-form input and generate annotated output that includes one or more annotations of the natural language input and optionally one or more (e.g., all) of the terms of the natural language input. As another example, the dialog annotator 122 may additionally or alternatively include a voice-to-text module that receives an instance of voice input (e.g., in the form of digital audio data), and converts the voice input into text that includes one or more text words or phrases. In some implementations, the voice to text module is a streaming voice to text engine. The voice to text module may rely on one or more stored voice to text models (also referred to as language models) that each may model a relationship between an audio signal and phonetic units in a language, along with word sequences in the language.

In some implementations, the dialog annotator 122 is configured to identify and annotate various types of grammatical information in natural language input (e.g., typed input and/or text converted from audio input). For example, the dialog annotator 122 may include a part of speech tagger configured to annotate terms with their grammatical roles. For example, the part of speech tagger may tag each term with its part of speech such as "noun," "verb," "adjective," "pronoun," etc. Also, for example, in some implementations the dialog annotator 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the dialog annotator 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the dialog annotator 122 may additionally and/or alternatively include a date and/or time module configured to annotate mentions of times and/or dates (e.g., "nine o'clock", "Monday") and/or to resolve ambiguous mentions of times and/or dates to more particular times and/or dates (e.g., resolve "Monday" to a particular date, resolve "8:00" to AM and/or Eastern Time).

In some implementations, the dialog annotator 122 may additionally and/or alternatively include a coreference resolver configured to group, or "cluster," references to the same entity based on one or more contextual cues. For example, the coreference resolver may be utilized to resolve the term "it" in an instance of input to a preceding mention of "engine" in an immediately preceding instance of input.

In some implementations, one or more components of the dialog annotator 122 may rely on annotations from one or more other components of the dialog annotator 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the dialog annotator 122 may use related prior input and/or other related data outside of the particular natural language input to determine one or more annotations.

In some implementations, the dialog annotator 122 may attempt to discern the semantics or meaning of user input and provide semantic indications to one or more other components of the system 120. The dialog annotator 122 may rely on one or more stored grammar models to map text (or other input) to particular actions and to identify attributes that constrain the performance of such actions, e.g., input variables to such actions.

Figure 4A:
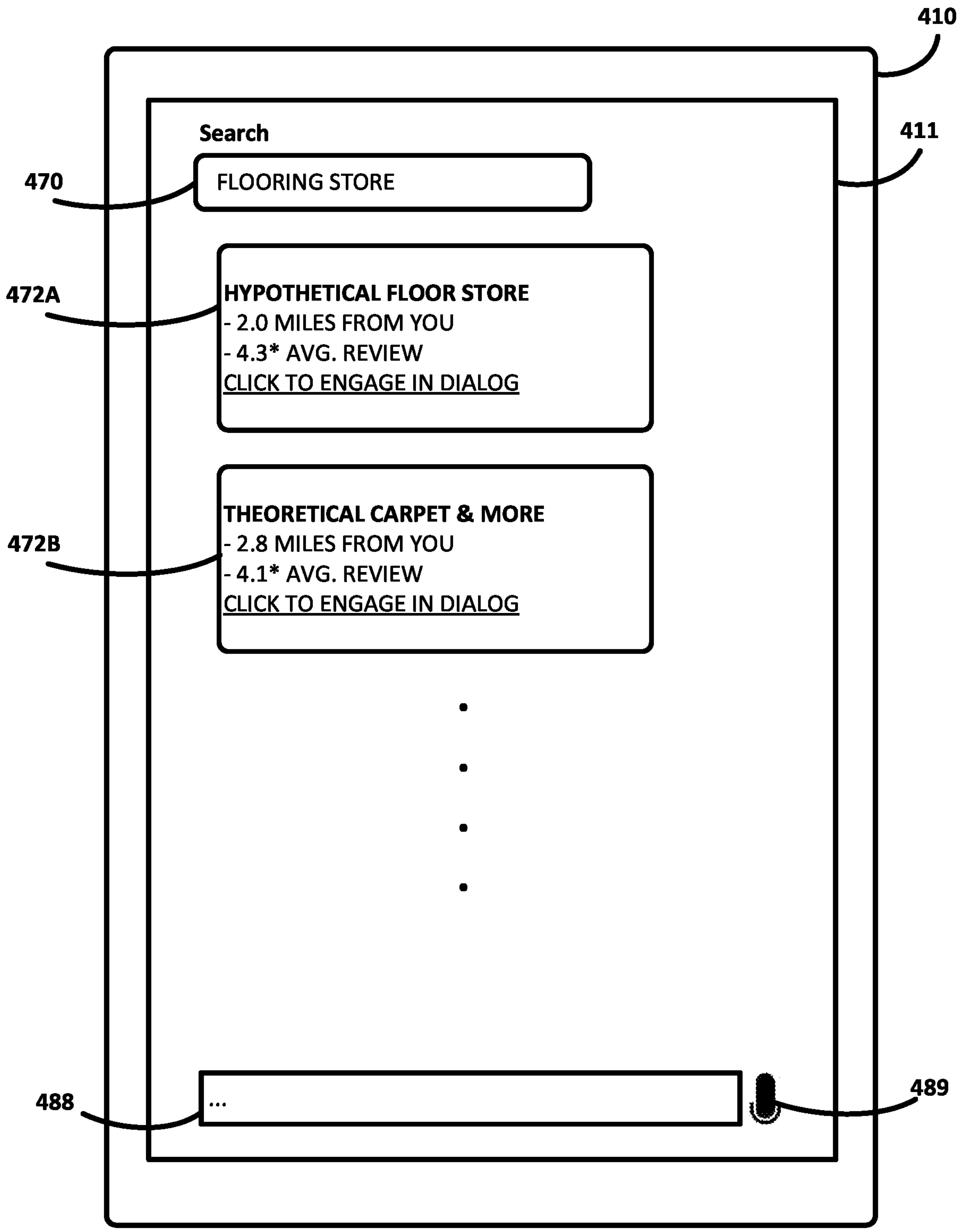
FIG. 4A, FIG. 4B, FIG. 4C, FIG. 4D, FIGS. 4E, and 4F illustrate example devices and graphical interfaces illustrating an example communication session according to implementations disclosed herein.

The agent resolution engine 124 resolves a particular agent for a communication session. In some implementations, the agent resolution engine 124 resolves the particular agent based on input, from the user device 110, that explicitly indicates the particular agent. For example, as illustrated in FIG. 4A (described in more detail below), the user may select an interface element that is associated with a particular agent to explicitly indicate that particular agent. Also, for example, the user may provide typed input and/or voice input that explicitly indicates a particular agent (e.g., "I want to talk to the Hypothetical Floor Store"). In other implementations, the agent resolution engine 124 resolves a given agent through engagement in dialog with the user via the user device 110, and matching parameters specified by the user in the dialog (and/or otherwise derived parameters), to corresponding parameters for the given agent in agents database 152. For example, if a user provides initial input of "I want to talk to a flooring store near me", the agent resolution engine 124 can identify, from agents database 152, three separate "floor stores" that are near the user. Further, the agent resolution engine 124 (through interaction with interaction engine 132) can provide an indication of the three "floor stores" and prompt the user to select one of the three. The indication can be, for example, names, reviews, ratings, and/or other parameters of the three stores, and may also be identified from the agents database 152. In yet additional or alternative implementations, the agent resolution engine 124 resolves a given agent based on availability of the given agent, geographic proximity of the given agent to the user (e.g., route request to the closest "plumber" agent), expertise of the given agent (e.g., route a "water heater repair" request to a "plumber" agent that specializes in water heaters), previous experience of the given agent (e.g., how many times has the given agent handled a similar request), a rating of the given agent, language(s) understood by the given agent (e.g., detect a language of a given user and route to an agent that is fluent in that language), and/or other criteria. In some implementations, the agent resolution engine 124 additionally or alternatively resolves a given agent and/or determines when to initiate a communication session with a given agent based on one or more additional signals such as contextual signals related to the user, the user device 110, a current date/time, historical interactions of the user, etc.

The agents database 152 stores, for each of a plurality of agents, parameters for the agent. Parameters for an agent can be supplied by one or more agent devices 140A-N of the agent during a registration process, determined based on responses to prompts from the system 120 as described herein, derived from another source (e.g., an entity database, scraping webpages associated with the agent), and/or otherwise obtained. Parameters for an agent can additionally or alternatively be determined based on past communication sessions that involve the agent. For example, an "appointment length" parameter can be determined based on a mean, median, or other measure of the duration of appointments manually scheduled by the agent in past communication sessions. The agents database 152 can also store various parameters for each of a plurality of domains, as described herein. A "domain", as used herein, is a classification that encompasses multiple agents that are members of that classification.

The intent engine 126 determines one or more current intents for a communication session utilizing annotated output from the dialog annotator 122 and one or more intent models 154. For example, annotated output can include annotations of received natural language input (e.g., natural language input from multiple turns) and can include the terms of the natural language input. The intent engine 126 can process such annotated output utilizing one or more of the intent models 154 to determine current intent(s) for the communication session. For example, the intent engine 126 can process input utilizing one or more of the intent models 154 to generate confidence levels for each of a plurality of candidate intents, and can determine one or more of those intents are "current" intents based on their confidence levels satisfying a threshold (e.g., a fixed threshold and/or a threshold that is relative to other confidence levels). In many implementations, the intent models 154 can include machine learning models, such as deep neural network models. In some of those implementations, each of the machine learning models can be trained to predict a probability that each of one or more intents is currently present in the communication session. A prediction can be generated based on a machine learning model by processing, using trained parameters of the machine learning model, of one or more inputs for the machine learning model, such as: received inputs in the communication session, annotations of those inputs, parameter(s) of an agent that is involved in the communications session, contextual parameters (e.g., location, time of day, day of week), etc.

In some implementations, the one or more intent model(s) 154 are each trained utilizing training examples that each include: training example input based on content of a corresponding instance of a corresponding historical user-agent communication; and labeled training example output indicating whether each of one or more intents is present for the corresponding instance. During training, parameters of a given intent model can be trained based on backpropagation of errors that are determined utilizing the training examples. For example, training example input (of a training example) can be processed using a given intent model to predict an output. Further, an error can be calculated based on comparison of the predicted output to the training example output (of the training example), and the error (and optionally other errors) backpgrogated across the given intent model to update its parameters. In various implementations, multiple intent models 154 are provided, with each being trained for a particular intent (or a particular group of intents) and/or for a particular domain (or a particular group of domains). The intent engine 126 can optionally utilize, at a given instance, only a subset of the intent models 154 in determining a current intent. In some of those situations, the intent engine 126 can select the subset based on a domain of the agent involved in the communication session and/or based on one or more other criteria. In this manner, computational resources can be conserved through selective utilization of only a subset of available intent models.

Various intents can be predicted by the intent engine 126 utilizing the intent models 154. Moreover, a given intent can be applicable to both the user and the agent, or can be applicable to only one of the user and the agent. Some non-limiting examples of intents include a "schedule intent" and/or more granularly defined intents such as a "schedule oil change intent", "schedule engine replacement intent", etc. Some non-limiting examples of intents further include an "open hours request" intent, a "call consumer" intent, a "call agent" intent, a "quote request" intent, a "fix plumbing issue intent", a "fix complicated plumbing issue intent", a "reply to user" intent, a "reply to agent" intent, a "take a picture" intent, a "take a picture of the water heater" intent, etc.

The action selection engine 128 selects, for a determined current intent, a corresponding action to effectuate the current intent. The action selection engine 128 can utilize one or more action models 156 to select the corresponding action. For example, the action models 156 may include a mapping between intents and actions, and the action selection engine 128 can select an action based on it being mapped to a current intent in the action models 156. An action selected by the action selection engine 128 defines one or more computer-based actions that can be utilized to effectuate the corresponding intent. An action can further define parameters that are desired and/or necessary for the action, as well as any computer apps, APIs, and/or other components that are utilized in performing the action. For example, for a "schedule" current intent, a "scheduling" action can be selected by the action selection engine 128, where the "scheduling" action defines one or more computer-based actions that can be utilized to effectuate the "schedule" current intent. In some implementations, an action can indicate whether content (e.g., an action performance element) is to be provided to the user device 110, one or more of the agents' devices 140A-N for the agent, or both. In some implementations, an action can additionally or alternatively indicate one or more action agents 135A-N that are to be utilized in performance of the action, one or more apps 112 and/or 142A that are to be utilized in performance of the action, and/or one or more user parameters and/or agent parameters that are to be utilized in performance of the action and/or in generation of an action performance element for the action.

The action parameters engine 130 determines action parameters for an action selected by the action selection engine 128. In some implementations, the actions parameters engine 130 determines one or more of the parameters based on communication(s) of the communication session. For example, the action parameters engine 130 can utilize output from dialog annotator 122 to select one or more of the parameters. For instance, assume natural language input from the user device 110 of "I'd like to schedule an appointment for tomorrow", and that a "scheduling" action for a "schedule" current intent is determined based on such input. The action parameters engine 130 can utilize a date annotation for "tomorrow" that is provided by the dialog annotator 122 to determine a specific date (tomorrow's date) for the scheduling action.

In some implementations, the actions parameters engine 130 determines one or more of the parameters based on stored parameters, in agents database 152, that are specific to the agent of the communication session and/or that are specific to a domain of the agent. For example, assume the agent is a flooring installer and that the action is a "scheduling" action. Further assume the agents database 152 defines, for the flooring installer and for the "scheduling" action, parameters that indicate: dates and/or times available for scheduling, a current availability for those dates and/or times, and that for a scheduling action two separate appointments on two separate dates should be made (e.g., one for "measuring/consultation", and another for "installing"). In such an example, the action parameters engine 130 can determine such stored parameters that are defined for the agent and for the action.

In some implementations, the actions parameters engine 130 determines one or desired or necessary parameters for an action are not defined for the agent of the communication session. In some of those implementations, the actions parameters engine 130 can determine those parameters based on parameters of agents database 152 that are defined for a domain of the agent, where the domain encompasses that agent and a plurality of additional agents. For example, assume that for a scheduling action the action parameters engine 130 determines a "number of appointments" parameter for a "scheduling" action is not defined in agents database 152 for a given flooring installer. In such a situation, the action parameters engine 130 may, in response, instead utilize a defined "number of appointments" parameter for a "flooring installer" domain. For example, the engine 130 can determine the "number of appointments" parameter is defined for the domain as "two separate appointments on two separate dates". In some implementations, parameters for a domain can be defined in agents database 152 for the domain based on analysis of parameter that are defined in the agents database 152 for members of the domain. For example, "two separate appointments on two separate dates" can be defined automatically for the domain based on it occurring most frequently among all agents of the domain for the "number of appointments" parameter.

The interaction engine 132 interacts with the user device 110, one or more of the agents' devices 140A-N, and/or action agents 135A-N in performance of the action, for the current intent, with the parameters determined by the action parameters engine 130. In some implementations, the interaction engine 132 generates an action performance element based on the action and the parameters, and transmits the action performance element to the user device 110 and/or the one of the agents' devices 140A-N of the agent. For example, the interaction engine 132 can generate an action performance element and transmit the action performance element to the user device 110. Selection of the action performance element via the user device 110 can initiate performance of the action via further interaction with the interactive communications system 120, one or more of the apps 112, etc. In some situations, the interaction engine 132 can interact with one or more action agents 135A-N in performance of an action. For example, assume a "scheduling" action performance element is transmitted to the user device 110 and includes a selectable element that, when selected, initiates an interactive scheduling action. The system 120 can optionally interact (e.g., over a network and via an API) with one of the action agents 135A-N to effectuate the interactive scheduling action. For example, that action agent can be a separate third-party (3P) agent that is a scheduling agent, and the interactive communications system 120 can serve as an intermediary between the user device 110 and that agent. In other implementations, the interactive communications system 120 can instead perform the scheduling functionality locally (without invocation of a separate action agent). In yet other implementations, that agent can be interacted with directly by the client device 110 (without the system serving as an intermediary) and/or one of the apps 112 may be utilized to perform the scheduling. In some implementations, the interaction engine 132 interacts with the user device 110, one or more of the agents' devices 140A-N, and/or action agents 135A-N in performance of the action—without providing a corresponding action performance element and/or without requiring a selection of the action performance element. For example, the interaction engine 132 can cause certain actions to be automatically performed on behalf of a given agent, without first prompting the given agent.

Figure 2:
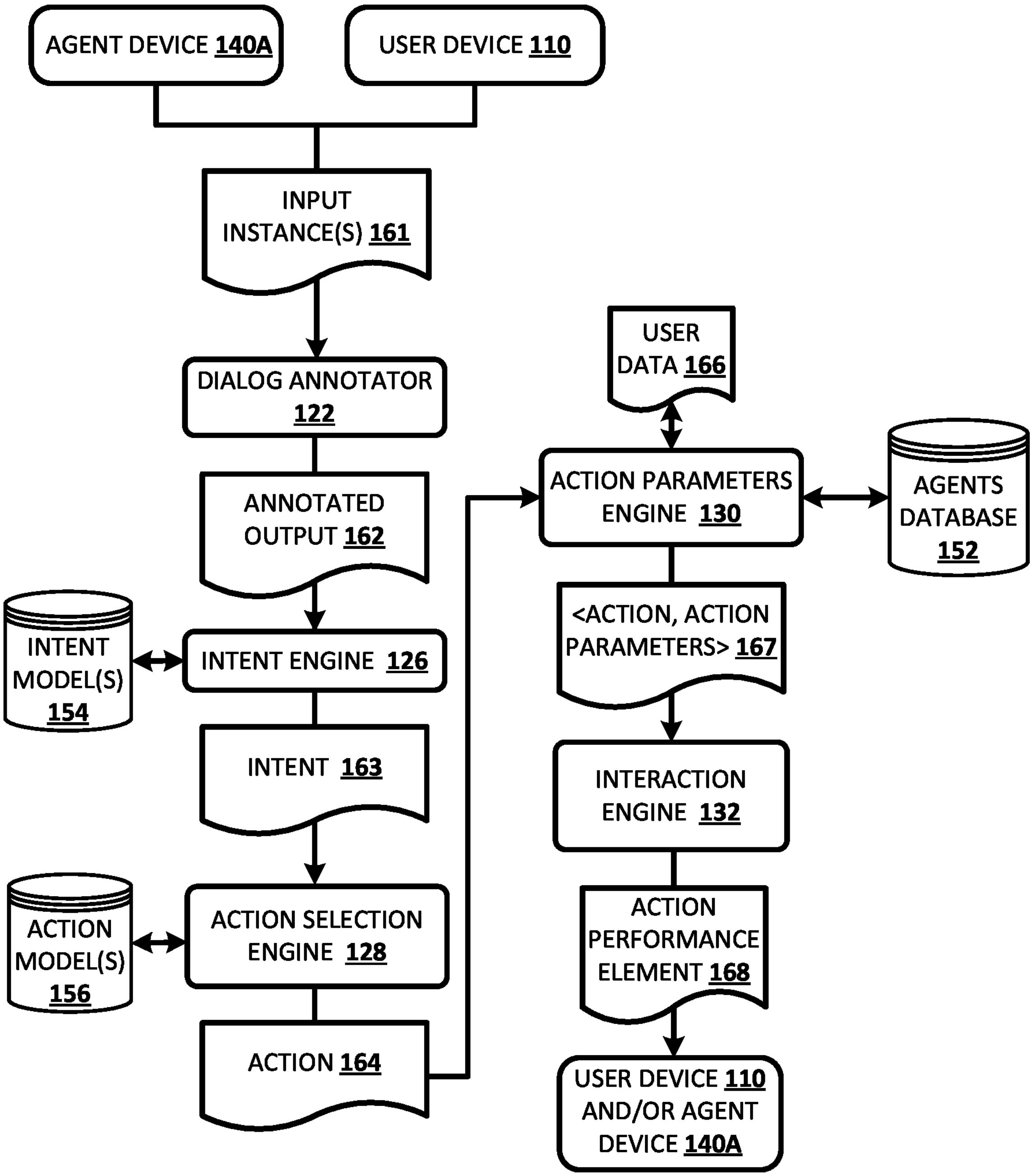
FIG. 2 illustrates an example of interactions that may occur between various components of the environment of FIG. 1, according to implementations disclosed herein.

Turning now to FIG. 2, additional description of various components of FIG. 1 is provided with reference to example interactions that may occur between those components. In FIG. 2, the user device 110, and/or the agent device 140A of an agent, generate one or more input instances 161 during a communication session that involves the user device 110 and the agent. Each of the input instances 161 is based on user interface input provided at a respective one of the devices 110, 140A. For example, the instance(s) 161 can include one or more natural language input instances.

The dialog annotator 122 receives the one or more input instance(s) 161, and generates annotated output 162 that includes annotations of the input, and optionally all or portions of the input itself. The intent engine 126 utilizes the annotated output 162, and one or more intent models 154, to determine at least one current intent 163 for the communication session.

The action selection engine 128 utilizes the determined at least one current intent 163 to select at least one action 164 that is mapped to the current intent 163 in the one or more action models 156. The action selection engine 128 provides the action 164 to the action parameters engine 130, which determines one or more parameters for the action.

In some implementations, the action parameters engine 130 accesses agents database 152 to determine action parameters, for the agent, for the action 164. For example, the action parameters engine 130 can determine action parameters for the agent based on the action 164 being an action that is to be provided to the user device 110, and that is tailored to the agent. As described herein, the action parameters can include one or more that are specific to the agent and/or can include one more that are defined for a domain of the agent. In some implementations, the action parameters engine 130 additionally or alternatively accesses user data 166 (e.g., from local user data 114 and/or remotely stored user data) to determine action parameters, for the user, for the action 164. For example, the action parameters engine 130 can determine action parameters for the user based on the action 164 being an action that is to be provided to the agent device 140A, and that is tailored to the user (e.g., a "contact" consumer action that includes content that is tailored based on a phone number parameter of the user). In some implementations, the action parameters engine 130 can determine both user parameters and agent parameters for the action 164. For example, for a scheduling action it may be desirable to obtain parameters for the user's current availability and for the agent's current availability.

The action parameters engine 130 provides the action, and the action parameters, to the interaction engine 132. The interaction engine 132 generates an action performance element 168 based on the action and the action parameters, and provides the action performance element 168 to the user device 110 and/or to the agent device 140A. The action can be performed, with the action parameters, in response to selection of the provided action performance element 168. For example, the action can be performed by the user device 110 or the agent device 140A alone, through further interaction between the respective device and the interaction engine 132, and/or through interaction between the interaction engine and one or more action agents 135A-N (FIG. 1).

Figure 3A:
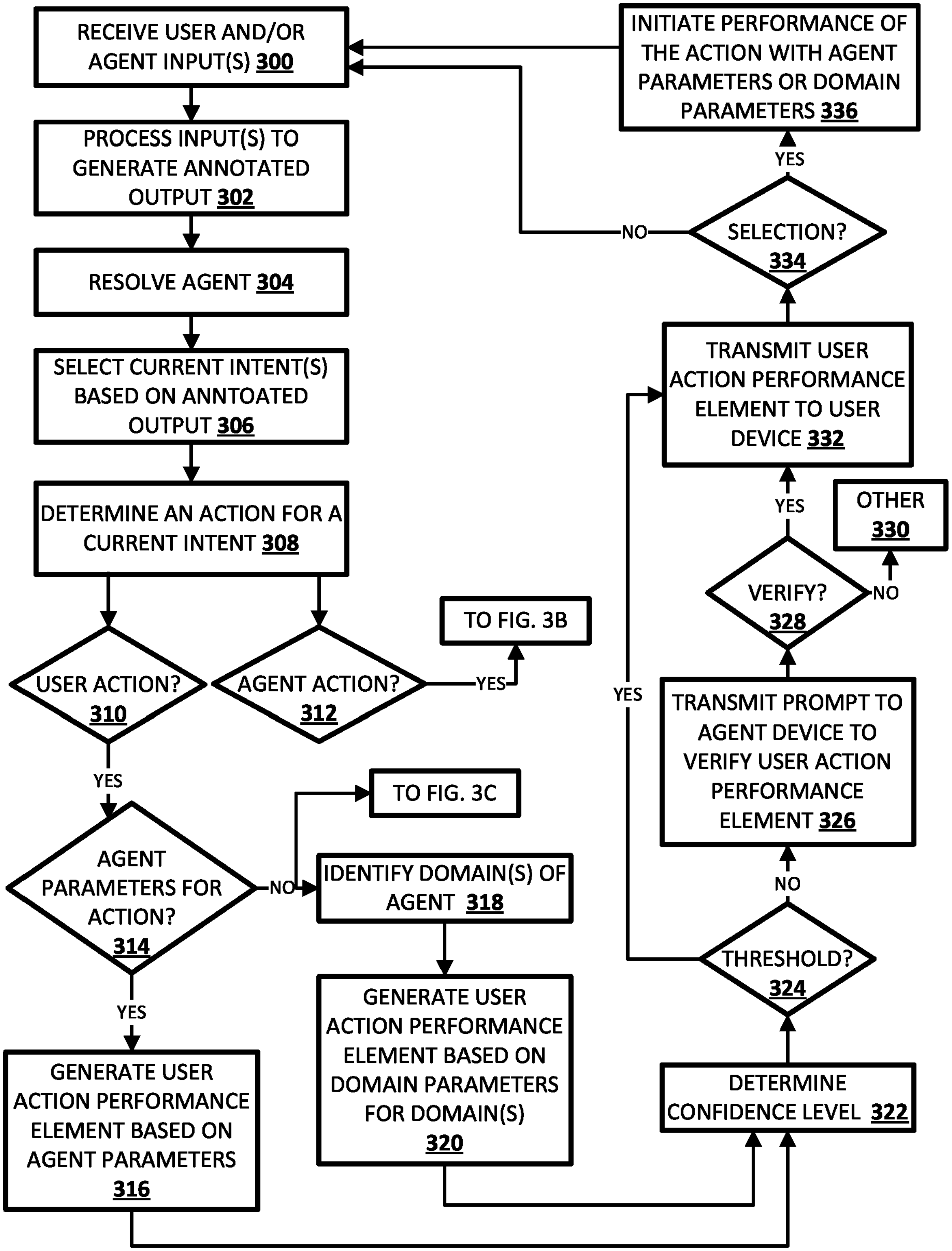
FIG. 3A, FIG. 3B, and FIG. 3C present a flowchart illustrating an example method according to implementations disclosed herein.
Figure 3B:
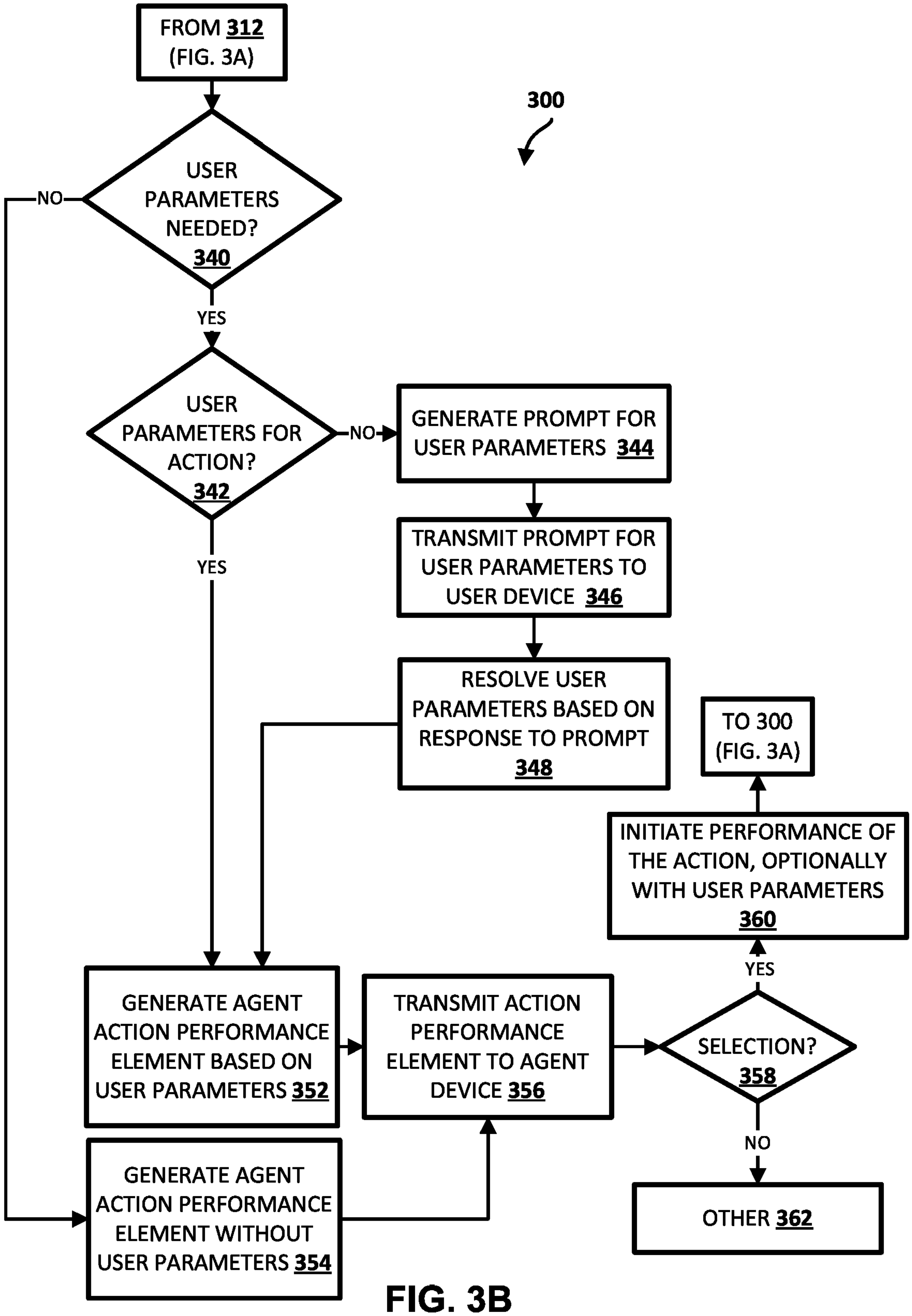
Figure 3C:
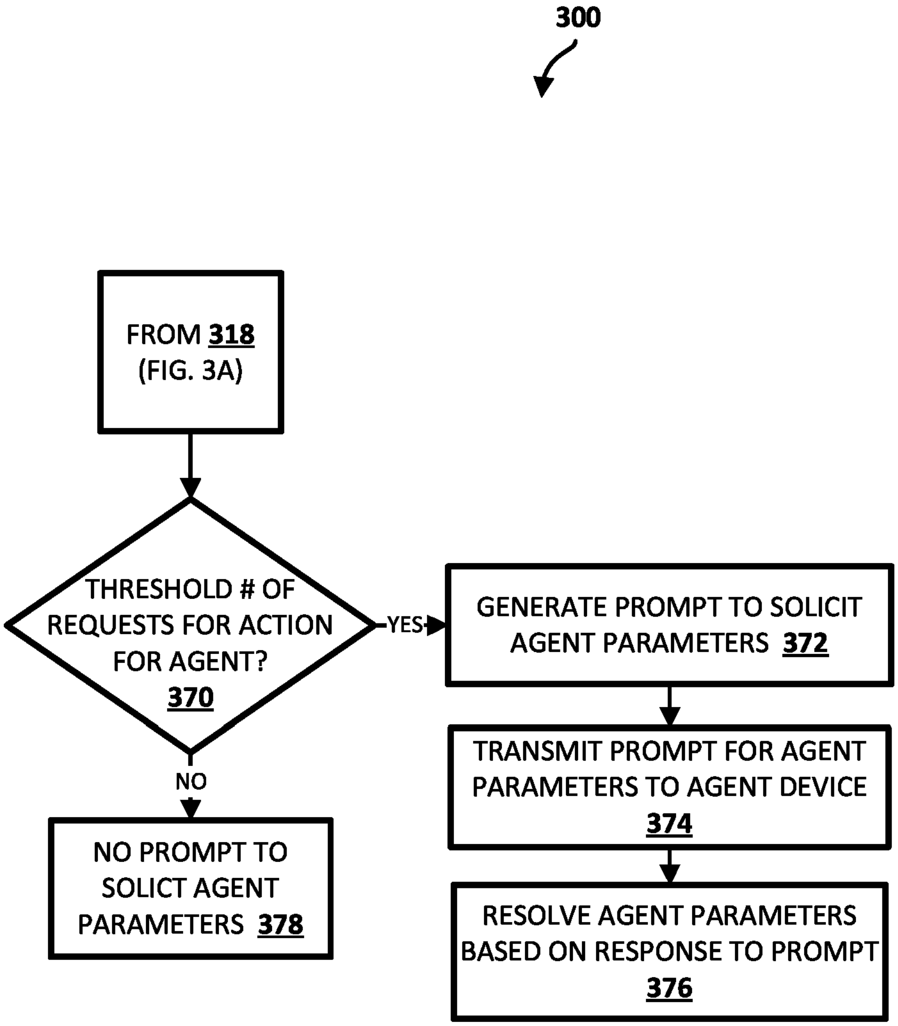

Turning now to FIGS. 3A, 3B, and 3C one example of a method 300 that may be performed by components of the environment of FIG. 1 are described. For convenience, the operations of the method 300 are described with reference to a system that performs the operations. This system may include various components of various computer systems, such as one or more components of interactive communications system 120. Moreover, while particular operations of method 300 are shown and are shown in a particular order, this is not meant to be limiting. One or more operations may be reordered, omitted or added.

At block 300, the system receives user and/or agent input(s) in a communication session. In some implementations, the user input received at block 300 includes natural language input that is free-form. For example, the system may receive typed user input in the form of text generated by a user device based on user input sensed by a physical or virtual keyboard of the user device.

At block 302, the system processes the input(s) to generate annotated output.

At block 304, the system resolves an agent. In some implementations, the system can resolve the agent before the communication session begins. For example, a user can select an interface element and/or provide a typed or spoken command to explicitly indicate an agent and to cause a communication session to be initiated with a particular agent. In some other implementations, the system resolves the agent during the communication session based on matching various parameters, specified and/or inferred during the communication session, to agent parameters of the agent.

At block 306, the system selects one or more current intents based on the annotated output of block 302. For example, the system can select a current intent based on processing the annotated output of block 302 over one or more trained machine learning models to generate a confidence level for each of multiple intents, and can select the current intent based on it satisfying a threshold.

At block 308, the system determines an action for a current intent, of the selected current intent(s) of block 306. For example, the system can determine the action based on it being mapped to the current intent in a database entry. In some implementations, at block 308 the system determines multiple actions for a current intent and/or determines multiple actions based on multiple current intents. In some of those implementations, one or more downstream blocks in method 300 can be performed for each of the multiple actions. For example, at block 332 (described below), multiple action performance elements corresponding to multiple disparate actions can be transmitted.

At block 312, the system determines whether the determined action of block 308 is an agent action. That is, is it an action that will directly result in an action performance element being transmitted to an agent device of the agent? If so, the system proceeds to block 340 of FIG. 3B (described in more detail below).

At block 310, the system determines whether the determined action of block 308 is a user action. That is, is it an action that will directly result in an action performance element being transmitted to a user device of the user? If so, the system proceeds to block 314. In some implementations, the system makes the determinations of block 310 and block 312 based on defined characteristics of the action and/or the corresponding intent. For example, each action and/or intent can be indicated as user directed, agent directed, or both.

At block 314, the system determines whether agent parameters are available for the action. For example, the system can determine whether agent parameters are available for all parameters of the action that are defined as desired and/or necessary. If so, the system proceeds to block 316, and generates a user action performance element based on the agent parameters. If not, the system proceeds to block 318 and identifies one or more domains of the agent 318. The system the proceeds to block 320 and generates a user action performance element based on domain parameter(s) for one or more of the domains identified at block 318. The system can also optionally proceed to block 370 of FIG. 3C (described in more detail below). It is noted that, in some implementations, the system can also generate a user action performance element, at block 316 or block 320, that is further based on one or more user parameters.

From block 316 or block 320, the system proceeds to block 322 and determines a confidence level for the action performance element generated at block 316 or block 320. In some implementations, the confidence level is based on a confidence level for the current intent of block 306. For example, the confidence level can be based on a probability or other confidence measure generated for the current intent utilizing one or more machine learning models. In some implementations, the confidence level is further based on one or more other factors. For example, the confidence level can be dependent on whether the action performance element was generated based on any domain parameters (confidence level would be less indicative of confidence if so, than if not). Also, for example, the confidence level can be dependent on a quantity of times an agent has previously approved the provision of the same and/or similar action performance elements in past communication sessions with other users. For instance, if "scheduling" action performance elements have been approved 50 times in the past by an agent, the confidence level can be more indicative of confidence than if only 5 approvals by the agent had occurred. As yet another example, the confidence level can be dependent on whether the agent has previously approved of automatic provision of action performance elements for a particular action or current intent.

At block 324, the system determines whether the confidence level satisfies a threshold. If so, the system proceeds to block 332 and transmits the user action performance element to the user device without first prompting any agent device of the agent.

If not, the system first proceeds to block 326 and transmits a prompt to the agent device to verify the user action performance element. At block 328, the system determines, based on a response to the prompt, whether the agent device has verified the user action performance element. If so, the system proceeds to block 332. If not, the system proceeds to block 330 and performs some other action. For example, at block 330 the system could prompt the agent device to make modifications to the action performance element, prompt the agent device for approval of the modified action performance element, and, if approved, send the modified action performance element in lieu of the action performance element. Also, for example, at block 330 the system could present alternative action performance elements, and if one is approved via user interface input at the agent device, it could be sent in lieu of the action performance element.

At block 334, the system monitors for a selection of the action performance element. If a selection occurs, the system proceeds to block 336 and initiates performance of the action with the agent parameters or the domain parameters. The system then proceeds from block 336 back to block 300 and awaits further user and/or agent input(s).

If at block 334, a selection doesn't occur, the system can proceed back to block 300. For example, if, instead of a selection, further non-selection input is received from the user device (e.g., an out-of-band question), the system proceeds back to block 300 and performs another iteration of step(s) outlined above based on the newly received non-selection input.

Turning now to FIG. 3B, description is provided of additional blocks that may occur in response to determining that the action of block 308 is an agent action. In other words, blocks downstream of block 310 in FIG. 3A illustrate an example of blocks that may occur for a user action, whereas blocks of FIG. 3B illustrate an example of blocks that may occur for an agent action. In some implementations, an action is only one of an agent action or a user action while, in other implementations, an action can be both. Moreover, it is understood that whether an action is a user action, agent action, and/or both in a given iteration will be dependent on the current intent for the given iteration, which in turn will be dependent on the particular communication session, the current inputs and state of the communication session, etc.

At block 340, the system determines whether user parameters are needed for the action. If not, the system proceeds to block 354 and generates an agent action performance element without user parameters. For example, for some "reply to consumer" actions, user parameters may not be needed. For instance, contextually relevant reply content suggestion elements can instead be generated based on natural language input of the communications session, and optionally based on historical agent responses to similar natural language inputs.

If, at block 340, the system determines user parameters are needed, the system proceeds to block 342. For example, for a "call user" action, a user parameter of the user's phone number may be needed. Also, for example, for some "reply to consumer" actions, user parameters may be needed. For instance, for a user question of "do you deliver to my ZIP code", a user parameter of the user's ZIP code may be needed.

At block 342, the system determines whether all user parameters for the action are available (e.g., are they defined in one or more resources available to the system). If so, the system proceeds to block 352. If not, the system proceeds to block 344.

At block 344, the system generates a prompt for the user parameters determined not to be available at block 342. At block 346, the system transmits the prompt for user parameters to the user device. At block 348, the system resolves the user parameters based on a response received from the user device in response to the prompt.

At block 352, the system generates an action performance element based on the user parameters determined at block 342 and/or block 348.

At block 356, the system transmits the action performance element (generated at either block 352 or block 354) to an agent device of the agent.

At block 358, the system monitors for a selection of the agent action performance element. If a selection occurs, the system proceeds to block 360 and initiates performance of the action. The system can initiate performance of the action with the user parameters (e.g., if the user parameters are determined to be needed at block 340). The system then proceeds from block 360 back to block 300 and awaits further user and/or agent input(s).

If, at block 358, a selection doesn't occur, the system can proceed to block 362 and perform some other function. For example, if no selection occurs within a certain amount of time, at block 362 the system can notify the user device that the agent is currently unavailable. Also, for example, if no selection occurs within a certain amount of time, at block 362 the system can present alternative action performance elements at the agent device.

Turning now to FIG. 3C, description is provided of additional blocks that may occur in response to determining, at block 314 of FIG. 3A, that agent parameters for the agent are not defined for the action.

At block 370, the system determines if a threshold measure of requests have been received, for the action and for the agent. The threshold measure can be, for example, a total number of requests received for the action and for the agent (e.g., the threshold can be 5, 10, or 50), a frequency at which requests for the action and for the agent have been received (e.g., the threshold can be 10 over the last 5 days, 20 per 5 days), and/or other measure. If the threshold measure of requests have not been received, the system proceeds to block 378 and does not transmit a prompt to solicit the agent parameters. If the threshold measure of requests have been received, the system proceeds to block 372 and generates a prompt to solicit the agent parameters. At block 374, the system transmits, to an agent device of the agent, the prompt for the agent parameters. At block 376, the system resolves the agent parameters based on a response, generated based on user interface input at the agent device, to the prompt. The system can store the resolved agent parameters in an agent database for utilization in further communication sessions and/or for other purposes.

Figure 4B:
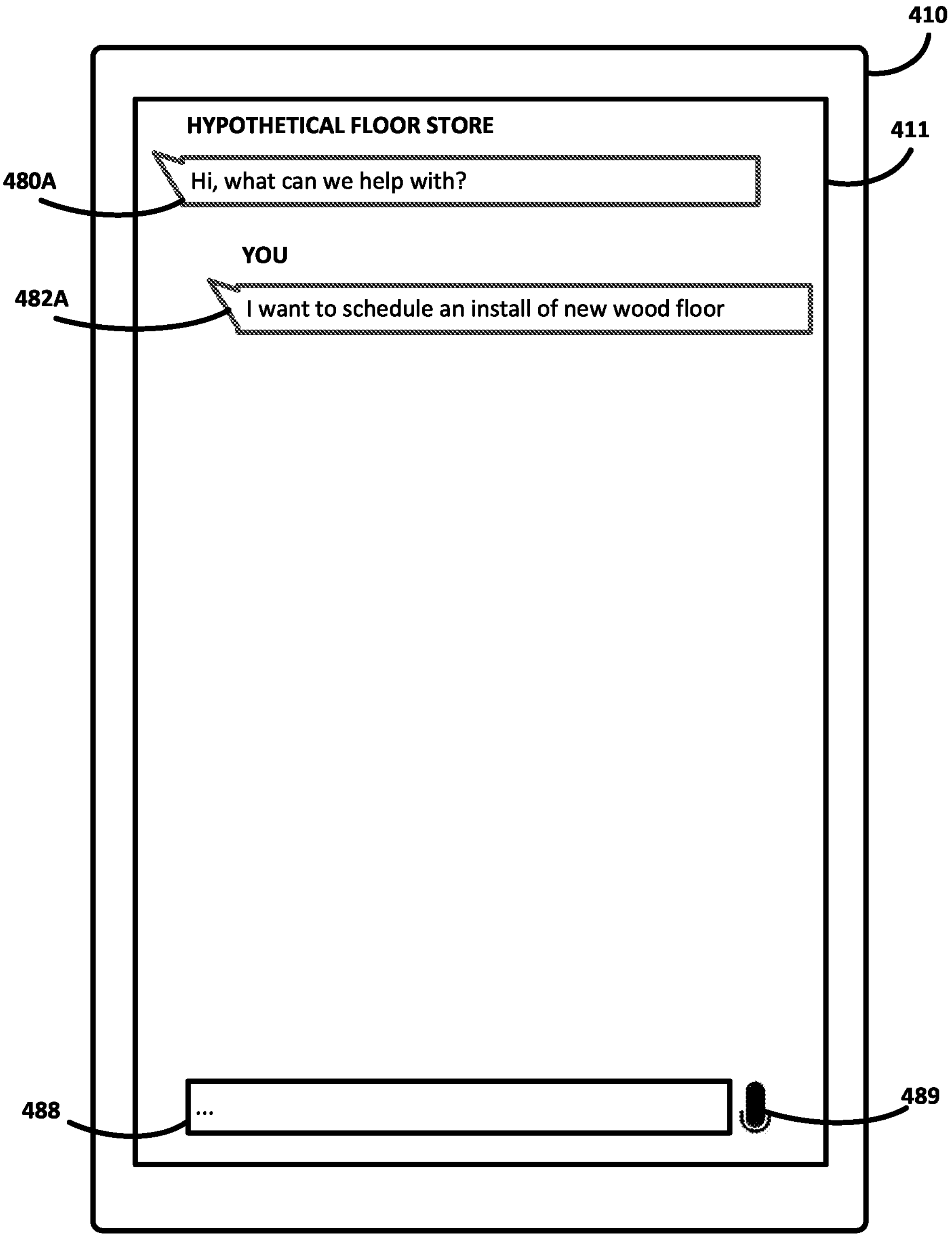
Figure 4C:
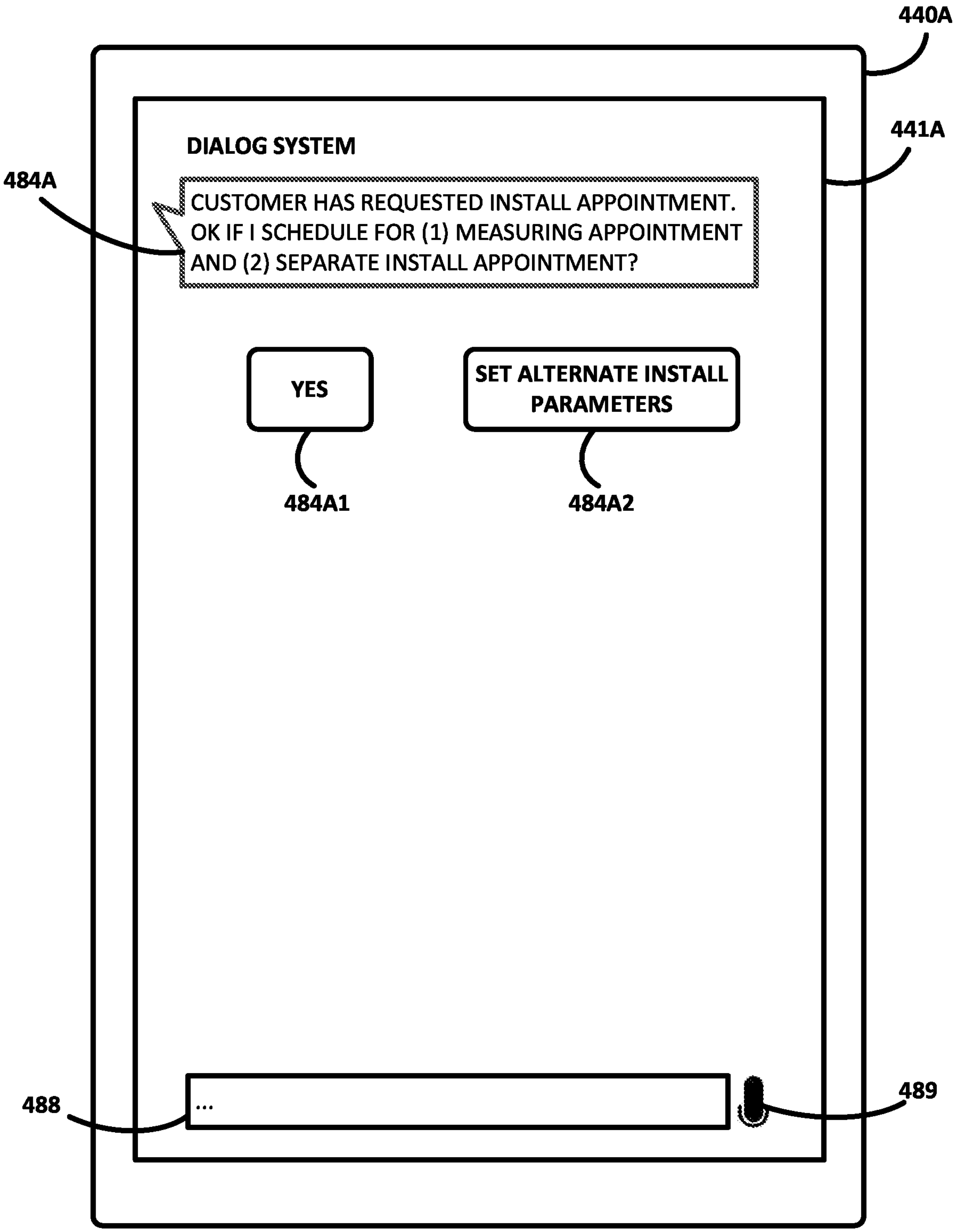
Figure 4D:
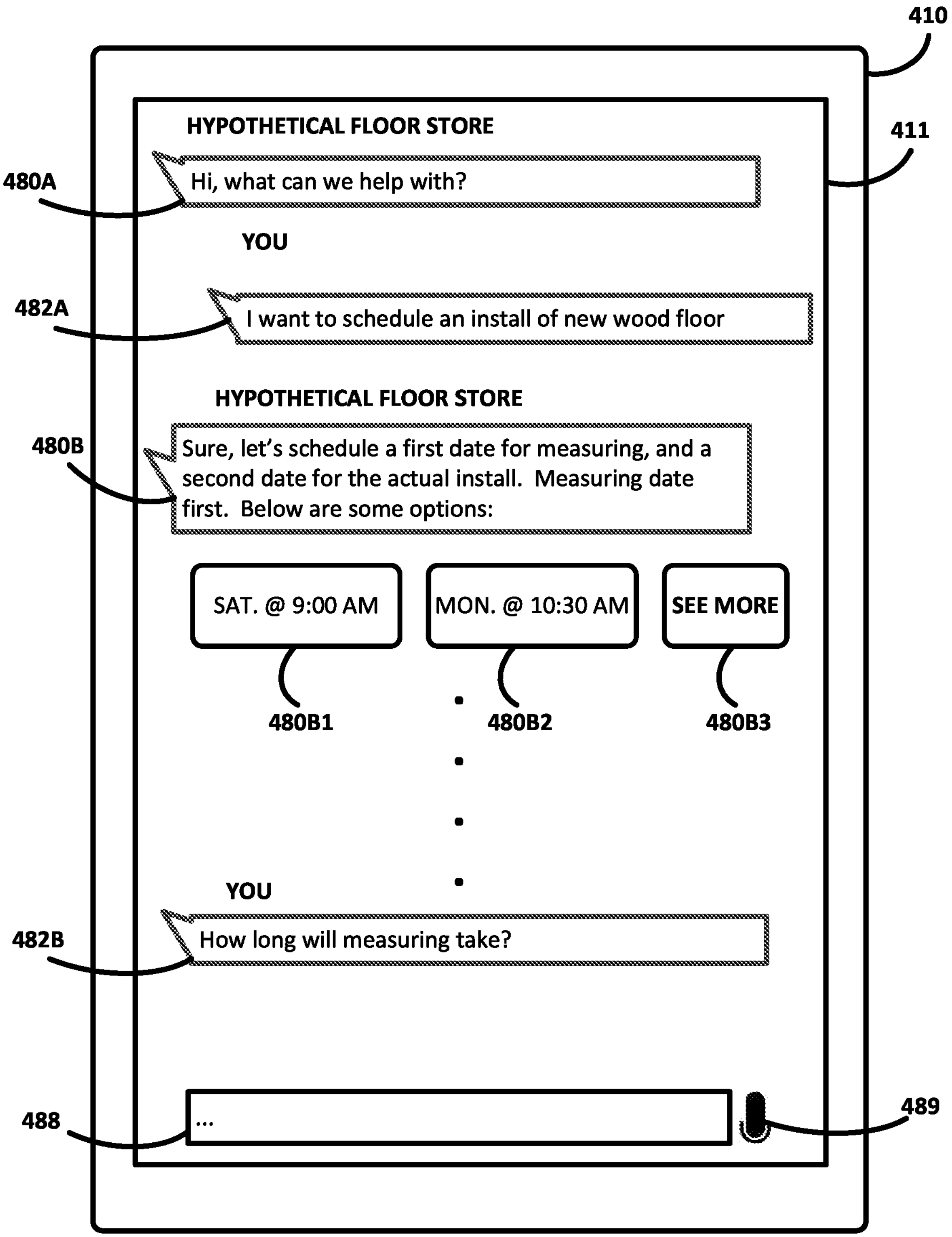
Figure 4E:
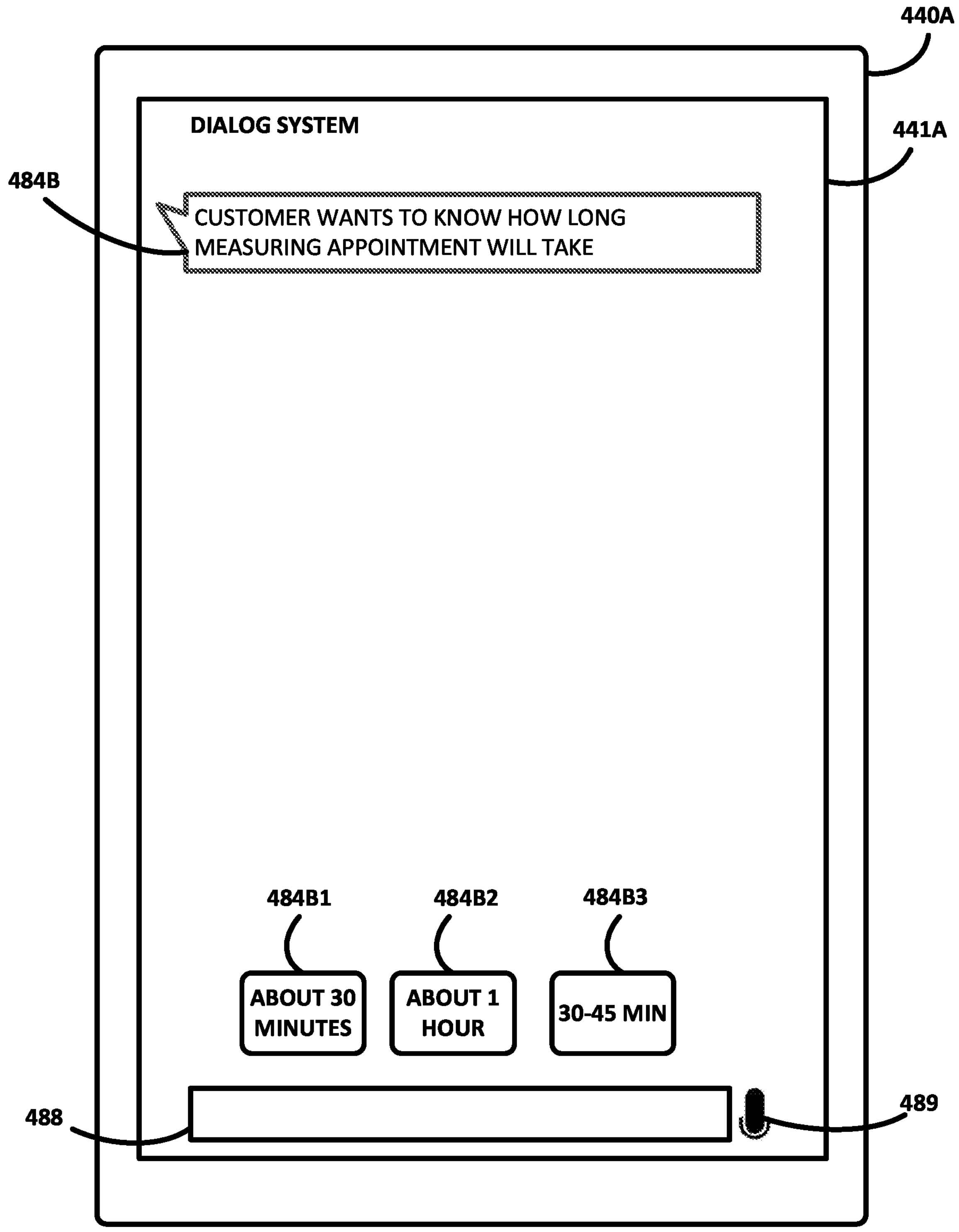

Turning now to FIGS. 4A-4F example devices and graphical interfaces of an example communication session are illustrated. FIGS. 4A, 4B, 4D, and 4F illustrate a user device 410 and a display screen 411 of the user device 410. A user of the user device is engaged in a communication session with an agent via the interactive communications system 120. FIGS. 4C and 4E illustrate an agent device 440A of the agent, and a display screen 441 of the agent device 440. The user device 410 and/or the agent device 440 may each include and/or be in communication with the interactive communications system 120. The display screens 411 and 441 are each shown throughout FIGS. 4A-4F with respective graphical interfaces that include a type interface element 488 that a corresponding individual may select to generate user input via a corresponding virtual keyboard and a voice interface element 488 that a corresponding individual may select to generate user input via a corresponding microphone.

In FIG. 4A, a user has utilized type interface element 488 or voice interface element 489 of user device 410 to submit a search query 470 of "flooring store". In response, a plurality of search results are returned, two of which are illustrated in FIG. 4A: first search result 472A and second search result 472B. First search result 472A corresponds to a first agent, "Hypothetical Floor Store" and includes a "click to engage in dialog" link that, if selected by the user, will establish a communication session with the "Hypothetical Floor Store" agent via interactive communications system 120. Second search result 472B corresponds to a second agent, "Theoretical Carpet & More", and includes a "click to engage in dialog" link that, if selected by the user, will establish a communication session with the "Theoretical Carpet & More" agent via interactive communications system 120.

In FIG. 4B, a user has selected the "click to engage in dialog" link for the first search result 472A. In response, a communication session is established with the interactive communications system 120 and is directed to the "Hypothetical Floor Store" agent. The interactive communications system 120 provides output 480A of "Hi, what can we help with" and it is indicated in the interface as originating from "Hypothetical Floor Store". In some implementations, the output 480A may be provided automatically by the system 120 based on it being assigned as a conversation starter, for the agent, in the agents database 152. In some of those implementations, an agent device for the agent can explicitly assign output 480A as a conversation starter for the agent. In other implementations, the output 480A can be assigned for the agent based on historical usage of the output 480A, as a conversation starter, by agent devices of the agent and/or by agent devices of other agents sharing domain(s) with the agent. For example, if an individual utilizing agent device 410 in the past had initiated a conversation with "Hi, what can we help with?", the system 120 could provide a prompt of "do you want to use this as a default conversation starter" and, if affirmative input is received, thereafter utilize "Hi, what can we help with?" as the conversation starter for the agent. Also, for example, if the system 120 determines that agent device(s) of the agent had utilized "Hi, what can we help with?" as a conversation starter in the past at least a threshold quantity of times and/or with a threshold frequency, the system 120 could thereafter utilize "Hi, what can we help with?" as the conversation starter for the agent.

In yet other implementations, the system 120 can provide a content suggestion element of "Hi, what can we help with?" to the agent device 440A as a suggested conversation starter, and can provide the output 480A in response to a selection of the content suggestion element at the agent device 440A. In some of those implementations, the content suggestion element can be suggested based on past interactions, via the agent device 440A (and/or other device(s) of the agent), with content suggestion elements provided as conversation starters. As one example, assume that "Hi, how can we help" was previously provided to the agent device 440A as a suggested conversation starter, and was edited by an agent user via the agent device 440A to instead read "Hi, what can we help with?". The system 120 can thereafter provide the content suggestion element of "Hi, what can we help with?" as a suggested conversation starter (or automatically transmit it on behalf of the agent) based on the agent user's prior edit of the conversation starter. In this manner, the system 120 can learn from edits of a content suggestion element by an agent, and offer the edited version of the content suggestion element to the agent in a future communication session (e.g., in lieu of the originally offered content suggestion element).

In response to the output 480A, the user provides typed or spoken input 482A of "I want to schedule an install of new wood floor". Based on the input 482A, the interactive communications system 120 determines a current intent of "schedule install appointment", and an action of "scheduling". Further, the interactive communications system 120 can determine that there are not any parameters defined for a "scheduling" action for the "Hypothetical Floor Store" agent. In response, the interactive communications system 120 can identify stored parameters for the "scheduling" action and for a domain of the agent (e.g., a "flooring" domain). The stored parameters for the domain can indicate that for a scheduling action two separate appointments on two separate dates should be made (e.g., one for "measuring", and another for "installing"). Based on the stored parameters for the domain, the interactive communications system 120 can generate the action performance element 480B of FIG. 4D, and cause it to be visually presented at the graphical user interface of the user device 410 as illustrated in FIG. 4D. The action performance element 480B of FIG. 4D indicates that two separate appointments are to be scheduled and includes selectable elements 480B1, 480B2, 480B3 that can be selected (e.g., through a tap or a voice selection) to initiate performance of the scheduling action.

However, prior to causing the action performance element 480B of FIG. 4D to be visually presented at the user device 410, the interactive communications system 120 can first cause to be presented, at the agent device 440A, an indication of the action performance element 480B—as illustrated in FIG. 4C. In FIG. 4C, the system 120 causes the prompt 484A to be presented at the agent device 440A. The prompt 484A asks the agent if it is acceptable to provide an action performance element that schedules two separate appointments. Further, the system 120 provides an affirmative user interface element 484A1 that can be selected by an individual associated with the agent to affirm that provision of the prompt is acceptable. In some implementations, the system 120 provides the action performance element 480B to the user device 410 in FIG. 4D only if the affirmative interface element 484A1 is selected. In some of those implementations, in response to selection of the affirmative interface element 484A1, the system can provide a further prompt via the agent device 440A to determine if the agent desires "two separate appointments" to be utilized for "scheduling" actions for the agent in the future. If affirmative input is received in response to such a prompt, the "two separate appointments" parameter can be stored as an agent specific parameter for the agent for "scheduling" actions. Also illustrated in FIG. 4C is an alternate parameters interface element 484A2 that can be selected by the individual to configure alternate parameters for an alternate action performance element that can be provided to the user device 410 in lieu of the action performance element 480B.

In some implementations, the interactive communications system 120 provides the prompt 484A to the agent device 440A in response to determining that one or more criteria are satisfied. For example, the system 120 can provide the prompt 484A based on the action performance element 480B being generated on parameters for the domain (whereas optionally no prompt is provided if an action performance element is generated based on only agent specific parameters). Although not illustrated in FIG. 4C, in various implementations a transcript of inputs from the user device 410 and/or of outputs to the user device 410 may optionally be displayed along with the prompt 484A.

Referring again to FIG. 4D, the action performance element 480B is presented at the user device 410 in response to selection, at agent device 440A, of the affirmative interface element 484A1 (FIG. 4C). The user of the user device 410 can select selectable elements 480B1, 480B2, or 480B3 to interactively schedule both the measuring appointment and the install appointment. For example, if the user selects selectable element 480B1, the user will then be prompted with selectable options for the "install date". The interactive communications system 120 and/or one of the action agents 135A-N can be utilized in the interactive scheduling. In some implementations, the dates and times of selectable elements 480B1 and 480B2 can be chosen based on availability data for the agent and/or the user, as can any additional interface elements presented upon selection of the "see more" selectable element 480B3.

In FIG. 4D, after the scheduling action is completed (as indicated by the four vertical dots), the user provides further typed or spoken input 482B of "How long will measuring take?". Based on the input 482B, the interactive communications system 120 determines a current intent of "agent textual reply" and an action of "send message". Further, the interactive communications system 120 can generate agent action performance elements 484B1, 484B2, and 484B3 (FIG. 4E), and cause them to be visually presented at the agent device 440A, as illustrated in FIG. 4E. The agent action performance elements 484B1, 484B2, and 484B3 are each textual suggestion elements, and each include text that is contextually relevant to the input 482B (FIG. 4D). Selection of any one of the agent action performance elements 484B1, 484B2, and 484B3 causes the corresponding text to be displayed at the user device as a reply from the agent. Also illustrated in FIG. 4E is an indication 484B that summarizes the input 482B and provides context for the agent action performance elements 484B1, 484B2, and 484B3. Alternatively, the input 482B itself could be presented at the agent device 441A.

In some of those implementations, in response to selection of one of the agent action performance elements 48481, 484B2, and 484B3, the system 120 can provide a further prompt via the agent device 440A to determine if the agent desires the selected textual response to be automatically sent for the agent in the future for "send message" actions that are responsive to "measuring appointment length" inquiries. Additionally or alternatively, the system 120 can utilize the response as a signal for determining, in the future for similar inquiries, whether an action performance element that include the selected response should be presented to the agent before sending to a user—or instead automatically sent.

Figure 4F:
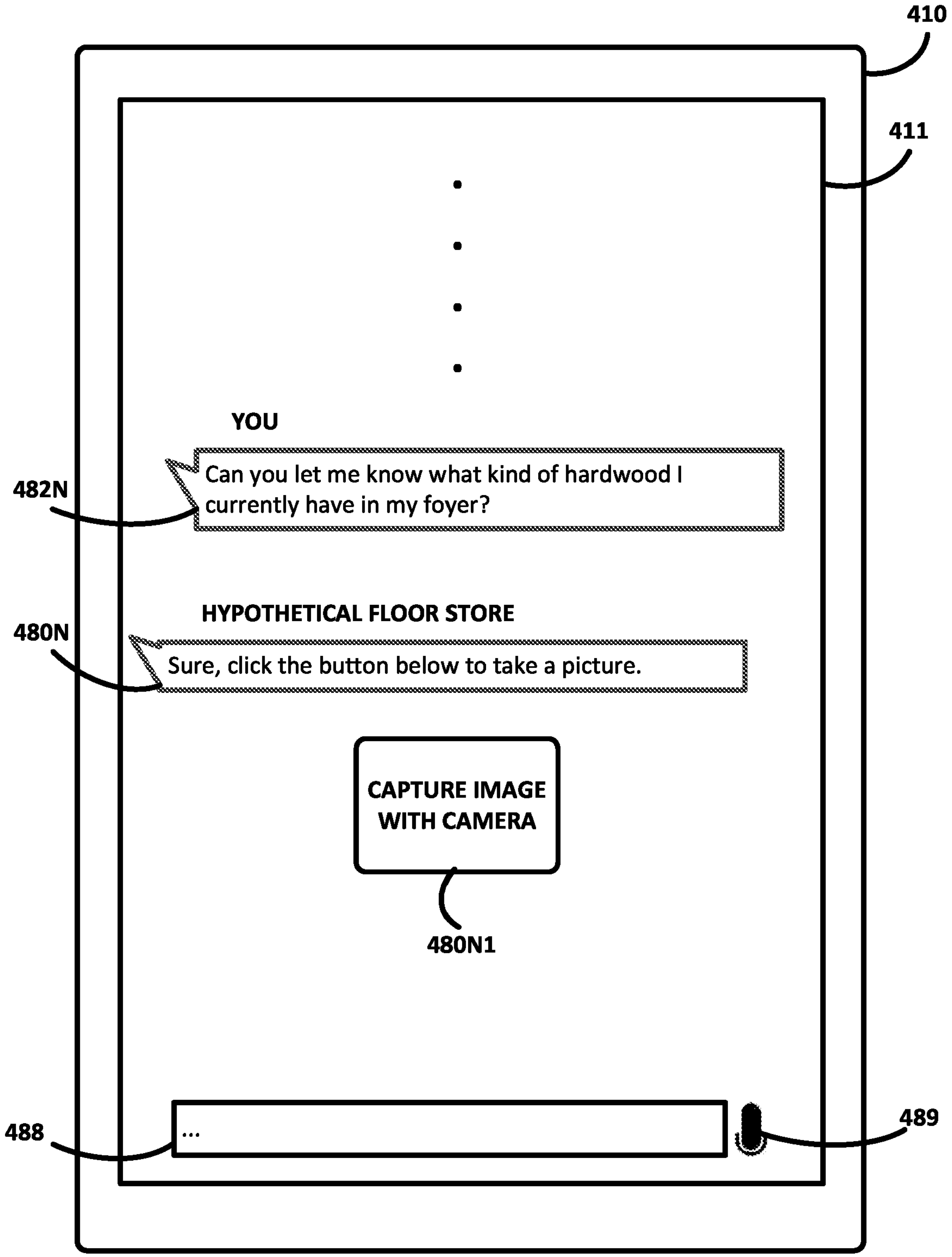

FIG. 4F illustrates further typed or spoken input 482N provided by the user later in the communication session, and an action performance element 480N that can be provided in response and that includes a selectable element 480N1. In response to selection of selectable element 480N1, the user device 410 can cause a camera interface and/or a separate camera application to be surfaced that enables a user to capture an image. The captured image can then be automatically (or after a user interface input) provided to the interactive communications system 120. In some implementations, the interactive communications system 120 can route the image to a separate agent device of the agent, based on that separate agent device being associated with an individual better suited to answer the query of input 482N (e.g., based on parameters in agent database 152 and/or historical interactions of agent device(s)). In some implementations, the interactive communications system 120 provides the action performance element 480N without first prompting any agent device. For example, the system 120 can provide the action performance element 480N without first prompting any agent device, in response to determining that a confidence level for the action performance satisfies a threshold, as described herein.

Figure 5:
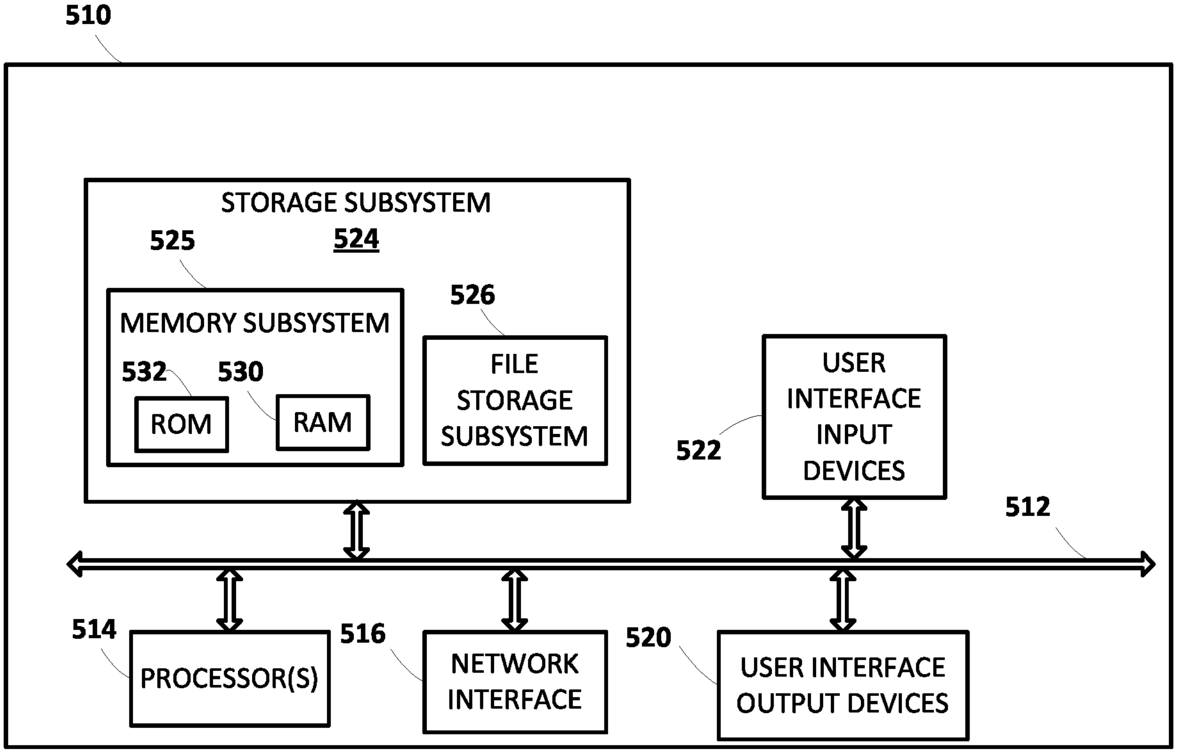
FIG. 5 illustrates an example architecture of a computing device.

FIG. 5 is a block diagram of an example computing device 510 that may optionally be utilized to perform one or more aspects of techniques described herein. In some implementations, one or more of the components of FIG. 1 may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIGS. 3A, 3B, and 3C.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A system comprising:

memory storing instructions;

one or more processors operable to execute the instructions to:

receive one or more instances of natural language input during a communication session that includes a user computing device and an interactive communications system implemented by one or more of the processors, the instances of the natural language input including free-form input formulated by a user of the user computing device via a user interface input device of the user computing device;

determine a current intent of the communication session and an action for the current intent, wherein determining the current intent and the action is based on processing the natural language input using one or more trained machine learning models;

resolve an agent for the action;

determine whether agent specific parameters, that are specific to the agent, are available for the action;

determine whether one or more criteria are satisfied for transmitting, to the user computing device, an action performance element that is based on the action, wherein determining whether the one or more criteria are satisfied is based on whether the agent specific parameters are available for the action;

in response to determining that the one or more criteria are satisfied:

transmit, to the user computing device without first prompting any agent computing device of the agent, the action performance element that is based on the action; and in response to determining that the one or more criteria are not satisfied:

transmit, to an agent computing device of the agent, a prompt related to the action, wherein the agent computing device is distinct from the user computing device, and then transmitting the action performance element to the user computing device only if affirmative input is received from the agent computing device in response to transmitting the prompt.

2. The system of claim 1, wherein the one or more criteria include that a confidence score for the current intent satisfies a threshold.

3. The system of claim 2, wherein the threshold is a fixed threshold.

4. The system of claim 1, wherein in determining whether the one or more criteria are satisfied based on whether the agent specific parameters are available for the action one or more of the processors are to:

determine, in response to determining that the agent specific parameters are not available, that the one or more criteria are not satisfied.

5. The system of claim 1, wherein selection of the action performance element causes the user computing device to initiate performance of the action by causing the computing device to execute a separate application.

6. The system of claim 1, wherein the one or more criteria are based on interactions of the agent in response to prompts related to the action and provided to the agent in past communication sessions.

7. A system comprising:

memory storing instructions;

one or more processors operable to execute the instructions to:

receive natural language input during a communication session that includes a user computing device, the natural language input including free-form input formulated by a user of the user computing device via a user interface input device of the user computing device;

process the natural language input to determine a current intent of the communication session and determine an action for the current intent, wherein determining the current intent and the action is based on applying the natural language input to one or more trained machine learning models;

generate an action performance element based on the action and stored parameters for the action that are specific to an agent;

transmit, to an agent computing device associated with the agent, an indication of the action performance element; and receive an affirmative response from the agent computing device in response to transmitting the indication of the action performance element;

subsequent to and contingent on receiving the affirmative response from the agent computing device:

transmit the action performance element to the user computing device, wherein selection of the action performance element causes the user computing device to initiate performance of the action with the stored parameters for the action that are specific to the agent; and based on receiving the affirmative response from the agent computing device, transmitting a subsequent action performance element, that is based on the action and the stored parameters for the action that are specific to the agent, without first transmitting any indication of the action performance element to the agent computing device.

8. The system of claim 7, wherein transmitting the indication of the action performance element causes the agent computing device to render a prompt for confirmation that transmitting the action performance element to the user computing device is acceptable.

9. The system of claim 8, wherein the prompt reflects the intent and the stored parameters for the action that are specific to the agent.

10. The system of claim 9, wherein the prompt includes an alternate parameters interface element that is selectable to configure alternate parameters for the action to utilize, in lieu of the stored parameters for the action, for an alternate action performance element.

11. The system of claim 8, wherein the prompt includes an alternate parameters interface element that is selectable to configure alternate parameters for the action to utilize, in lieu of the stored parameters for the action, for an alternate action performance element.

12. The system of claim 8, wherein one or more of the processors are further operable to execute the instructions to:

transmit, to the agent computing device associated with the agent, a transcript for the free-form input formulated by the user of the user computing device, wherein transmitting the transcript causes the agent computing device to render the transcript along with rendering of the prompt.

13. The system of claim 11, wherein the communication session includes an output rendered to the user of the user computing device prior to receiving the natural language input.

14. The system of claim 13, wherein one or more of the processors are further operable to execute the instructions to:

transmit, to the agent computing device associated with the agent, an output transcript for the output, wherein transmitting the output transcript causes the agent computing device to render the output transcript along with rendering of the prompt.

15. The system of claim 8, wherein the communication session includes an output rendered to the user of the user computing device prior to receiving the natural language input.

16. The system of claim 15, wherein one or more of the processors are further operable to execute the instructions to:

transmit, to the agent computing device associated with the agent, an output transcript for the output, wherein transmitting the output transcript causes the agent computing device to render the output transcript along with rendering of the prompt.

* * * * *